United States Patent

Kato et al.

[11] Patent Number: 5,963,199
[45] Date of Patent: Oct. 5, 1999

[54] IMAGE PROCESSING SYSTEMS AND DATA INPUT DEVICES THEREFOR

[75] Inventors: Toshihiko Kato; Makoto Ohara; Hiroshi Murayama, all of Tokyo, Japan

[73] Assignees: Kabushiki Kaisha Sega Enterprises; Sega Enterprises, Ltd., both of Tokyo, Japan

[21] Appl. No.: 08/797,261

[22] Filed: Feb. 7, 1997

[30] Foreign Application Priority Data

Feb. 9, 1996 [JP] Japan ................................. 8-024480

[51] Int. Cl.$^6$ ........................................ G09G 5/00
[52] U.S. Cl. ........................ 345/179; 345/173; 345/156
[58] Field of Search ................................ 345/173, 174, 345/175, 179, 180, 181, 182, 183, 156, 157, 159; 178/18, 19, 18.01, 18.1, 19.04

[56] References Cited

U.S. PATENT DOCUMENTS

| | | | |
|---|---|---|---|
| 4,862,497 | 8/1989 | Seto et al. ............................. | 379/355 |
| 4,902,858 | 2/1990 | Yamanami et al. .................... | 345/173 |
| 5,134,388 | 7/1992 | Murakami et al. .................... | 345/173 |
| 5,571,997 | 11/1996 | Gray et al. ............................. | 345/173 |
| 5,610,629 | 3/1997 | Baur ...................................... | 345/173 |
| 5,670,992 | 9/1997 | Yasuhara et al. ..................... | 345/173 |

FOREIGN PATENT DOCUMENTS 63-305896  12/1988  Japan .

*Primary Examiner*—Xiao Wu
*Attorney, Agent, or Firm*—Finnegan, Henderson, Farabow, Garrett & Dunner, L.L.P.

[57] ABSTRACT

An image processing system including a plurality of pen-like input units 31 which produce signals of frequencies inherent to the respective input units, a panel 32 responsive to a touch of the input unit 31 thereto for detecting its touch position and produced signal frequency, an image processor 5 which performs a predetermined image processing operation depending on signals indicative of the touch position and frequency from the panel 32, and a display 7 which displays the result of the image processing by the image processor 5. The respective frequencies determine corresponding color information used. The image processor 5 performs an image processing operation on the basis of the determined color information. Even when a card is used, page detection is performed in an optically non-contact manner, using a simple structure.

15 Claims, 24 Drawing Sheets

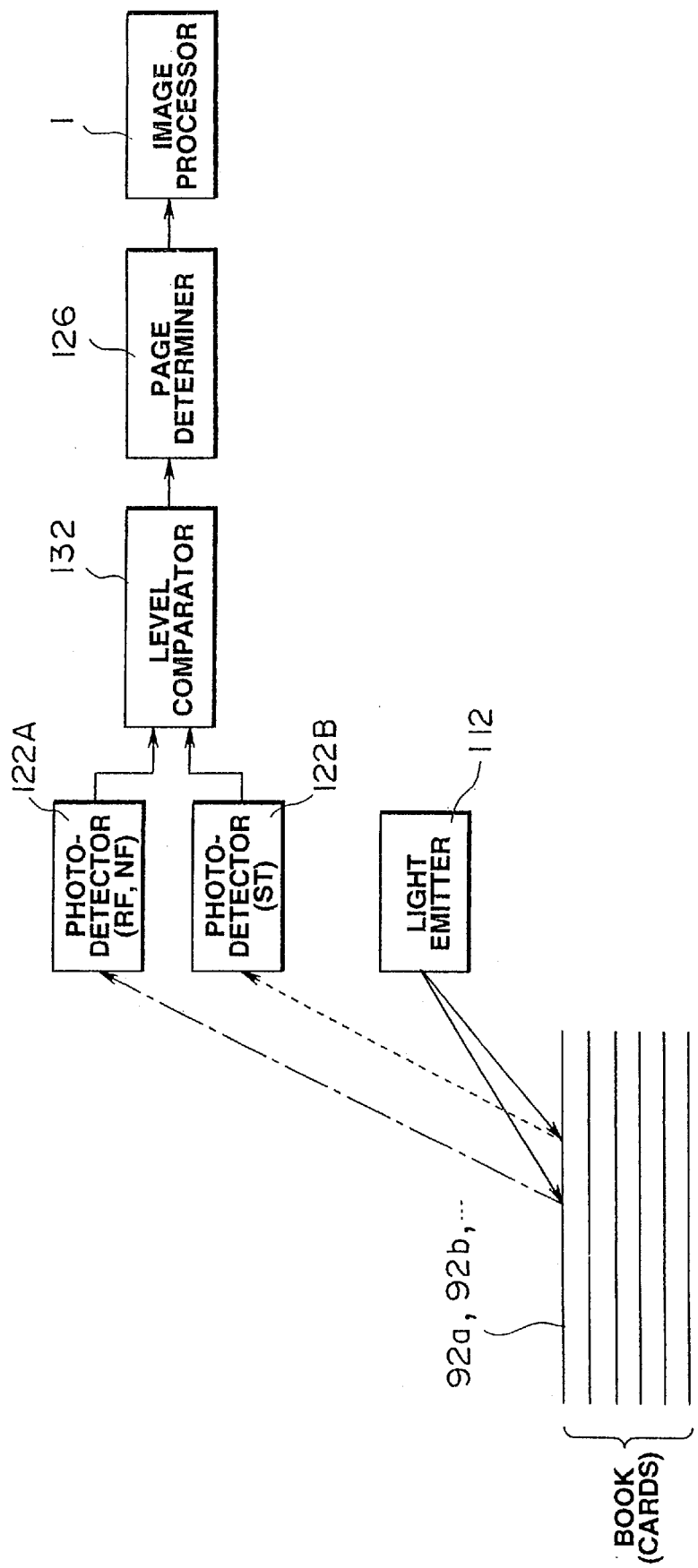

IMAGE PROCESSING SYSTEMS AND DATA INPUT DEVICES THEREFOR

BACKGROUND OF THE INVENTION

The present invention relates to image processing systems and data input devices therefor. More particularly, the present invention relates to a data input device which comprises input means such as a pen-like device used to input data on an image and/or characters or a card turned over by hand, and means for automatically detecting information on a two-dimensional position of the input means and positional information on a page, and an image processing system using such data input device.

Generally, a data input device is known as inputting image and/or character data to an image processor. An image processing system is composed of the data input device, the image processor and a display.

Recently, a picture drawing system for childrens' use is provided in which an image processing system such as that mentioned above is applied (for example, a "PICO" (trademark) manufactured by Sega Enterprises Ltd.). A picture drawing system of this type is composed, for example, of pen-like or pencil-like input means, a panel for detecting the position where the input means inputs data, an image processor which performs a predetermined image process in accordance with the input position information from the panel, and a display which displays the result of the image processing by the image processor.

With those systems, for example, the pen-like or pencil-like (hereinafter generically referred to as pen-like) input means has an oscillator therein, the osculating frequency from which is sent from an antennal coil of the input means. A tip of the input means is touched on a panel of the system to draw a picture. In response to this operation, the panel determines the position of the input means thereon based upon the basis of the frequency generated by the input means, and inputs the information of the input position to the image processor. The image processor performs an image process on the basis of the information of the input position, and gives the result of the processing to the display to thereby display on the display an image similar to a figure or the like drawn on the panel by the input means.

Conventionally, an image processing system is provided which includes an image processor and a data input device which specifies the contents of data recorded on a card and inputs the specified data to the image processor. More specifically, the data input device includes, for example, a plurality of cards on which predetermined matters are recorded, the card having a plurality of holes along its edge through which corresponding holding hooks of the system body are inserted to hold the cards openable hingedly, and having at the other edge a cut depending on the matter recorded on the card to thereby form and output data which specifies the matter recorded on the card on the basis of the cut.

In this data input device, the matter recorded on the card open at present is viewable, the matter recorded on the card viewed at present is specified from the position of that cut and data indicative of the matter is inputted into the data processor, which performs a predetermined data process on the input data, displays the result of processing on the display, and also outputs the result of the processing audibly.

Conventionally, there are various methods of detecting a page in a data input device of such card turnover type. To provide one example, a reflective sensor system is known which includes a plurality of sensors which each detect the presence of an object. Another example is a contact bar code sensor used, for example, in a G-code preservation device. A further example is a non-contact bar code sensor used, for example, in a supermarket cash register and/or in an automatic shipping check unit in a factory.

However, in the conventional picture drawing system having a pen-like input means, a picture drawn on the panel by the input means is only displayed in a specified color on the display. When the picture is to be drawn in another color, function keys, for example, are required to be used to specify a color. Thus, this system is difficult for a child to manipulate.

According to the conventional data input device of the card turnover type, a card only has a physical cut at one edge, so that a large number of cuts is physically difficult to provide. Thus, a quantity of information which the cut provides is limited and various complicated information cannot actually be set in the cut area.

The conventional various sensors of the card turnover type for detecting a page have various problems. For example, when a reflective sensor is used, the number of objects which the sensor detects is one, so that when the number of piled cards increases, that is, when the number of objects to be detected increases, the number of sensors are required to increase, and the sensor assembly becomes large in size. In order to use the contact bar code sensor, manipulation of the sensor is required such that the distance between the sensor and an object is constantly fixed. Thus, manipulation of the sensor takes time and is troublesome. With the non-contact bar code sensor, the sensor itself must use expensive parts such as a laser device or a CCD.

It is therefore a main object of the present invention to provide a data input device which is capable of providing an increased quantity of detection information such as manipulation information obtained when pen-like writing means is manipulated and/or page numbers detected when cards which compose a book are turned over, and an image processing system using such data input device.

Another object of the present invention is to provide a data input device which includes a pen-like input means which is capable of drawing a picture on a drawing area, for example, of paper and outputting an input signal indicative of an image depending on the manipulation of the input means along with its color information in a simple operation, and an image processing system using such data input device.

Still another object of the present invention is to provide a data input device which includes input means such as a card and which is capable of setting various complicated information changing depending on the manipulation of the input means, and an image processing system using such data input device.

A further object of the present invention is to provide an image processing system which includes a small inexpensive and easy-to-operate data input device including input means such as cards and which is capable of adapting to an increase in the number of input means.

SUMMARY OF THE INVENTION

In order to achieve the above objects, according to the present invention, there is provided an image processing system comprising:

- a data input device which includes input means for inputting data to the system;
- an image processing device for performing a predetermined image processing operation on the data inputted by the data input device; and a display device for displaying the result of the image processing operation performed by the image processing device.

The data input device has a structure to detect information at a position where the input means is manipulated to thereby increase a quantity of information to be detected.

Preferably, the data input means includes means for generating a frequency inherent thereto and a panel responsive to a touch of the data input means to the panel for detecting the position of the touch of the data input means on the panel and for selecting color information corresponding to the frequency, and said image processor performs an image process on the basis of the selected color information.

Thus, when the input means is used to draw a picture or the like on the paper placed on the panel, information on an inherent color in which characters or a picture are to be written or drawn in and information on the type of the input means are determined from the frequency of the input means. This information is then inputted into the image processing means, which performs the image process depending on the determined color information and position information.

Preferably, the input means comprises oscillating means for producing a frequency depending on predetermined color information.

Preferably, the input means comprises writing means for writing a character, a symbol and/or a figure on a drawing area, and oscillating means for producing a frequency depending on the color of the writing means.

Preferably, the input means comprises writing means for writing a character, a symbol and/or a figure on a drawing area, and oscillating means for producing a frequency depending on the color of the writing means, and a pen-like housing for accommodating the writing means and oscillating means.

Preferably, the input means comprises oscillating means for producing an allocated frequency for a predetermined period of time only when the input means is placed on said panel.

Preferably, the input means comprises oscillating means for producing an allocated frequency for a predetermined period of time only when the input means is placed on the panel, and a housing for accommodating the oscillating means.

Preferably, the input means further comprises means for outputting a signal to change the oscillating frequency of the oscillating means depending on the writing pressure of the writing means. The input means generates an inherent reference frequency. When a predetermined writing pressure is applied to the input means, the frequency generated by the input means changes to produce a signal, for example, to draw a picture in a thin color in place of a signal to draw a picture in a thicker color which has been outputted so far.

Preferably, the data input device comprises a plurality of cards each used as an input medium for data with a code section at one end of that card on which information including at least a page of that card is stored, means for piling the cards the number of which are changeable, and detecting means disposed at a position deviating horizontally and upward from the card so as to face the code section on the card for detecting information on the code section in a non-contact manner.

Preferably, the piling means piles the plurality of cards such that the cards may be turned over along their respective edges. Thus, information, for example, on a picture and/or characters recorded or expressed on a turned-over page of a book is specified and sent to the image processor.

Preferably, the code section contains a bar code or a binary code which, in turn, contains information on the page concerned. This code provides an increased amount of information including information on a page of a book and its type.

Preferably, the area of the code section of a card increases away from said detecting means as the position of the card deepens. Thus, a change in the detection distance involved in the whole thickness of cards (book) depending on the turnover of a card page is compensated.

Preferably, the detecting means comprises light emitting means for emitting light having any number of optical axes, and photodetection means for detecting a portion of the light emitted by the light emitting means and reflected by the code section.

Preferably, the detecting means comprises an optical reflector disposed in at least one of an optical path between the light emitting means and the code section and an optical path between the code section and the photodetection means. The use of the reflector increases the degree of freedom of setting of the optical path, facilitates in the arrangement of an optical system, and serves to form a compact structure of the input device.

Preferably, the detecting means comprises light emission driving means for causing said light emitting means to emit light, and signal processing means for processing a signal depending on the reflected light portion detected by the photodetection means to read information includes a page of the card.

Preferably, the light emission driving means comprises a circuit for emitting light based on a signal modulated with a specified frequency, and the signal processing means comprises a circuit for extracting a signal having the specified frequency from among the reflected light portion detected by the photodetection means. Thus, the influence of external light is eliminated greatly to improve the accuracy of detection and the reliability.

Preferably, the code section comprises for each bit a reference surface and a detection surface with the information on the detection surface, the photodetection means comprise for each bit a pair of a photodetection element for detecting the reflected light from the detection surface and a photodetection element for detecting reflected light from said reference surface, and the signal processing means compares output signals from both the photodetection elements to read the information. Thus, the influence of external light is greatly avoided to improve the accuracy of detection and the degree of freedom of designing the signal processor.

BRIEF DESCRIPTION OF THE DRAWINGS

FIG. 30 is a block diagram indicative of an electrical system connected to a light emitter and a photodetector.

DESCRIPTION OF THE PREFERRED EMBODIMENTS

First Embodiment

Figure 1:
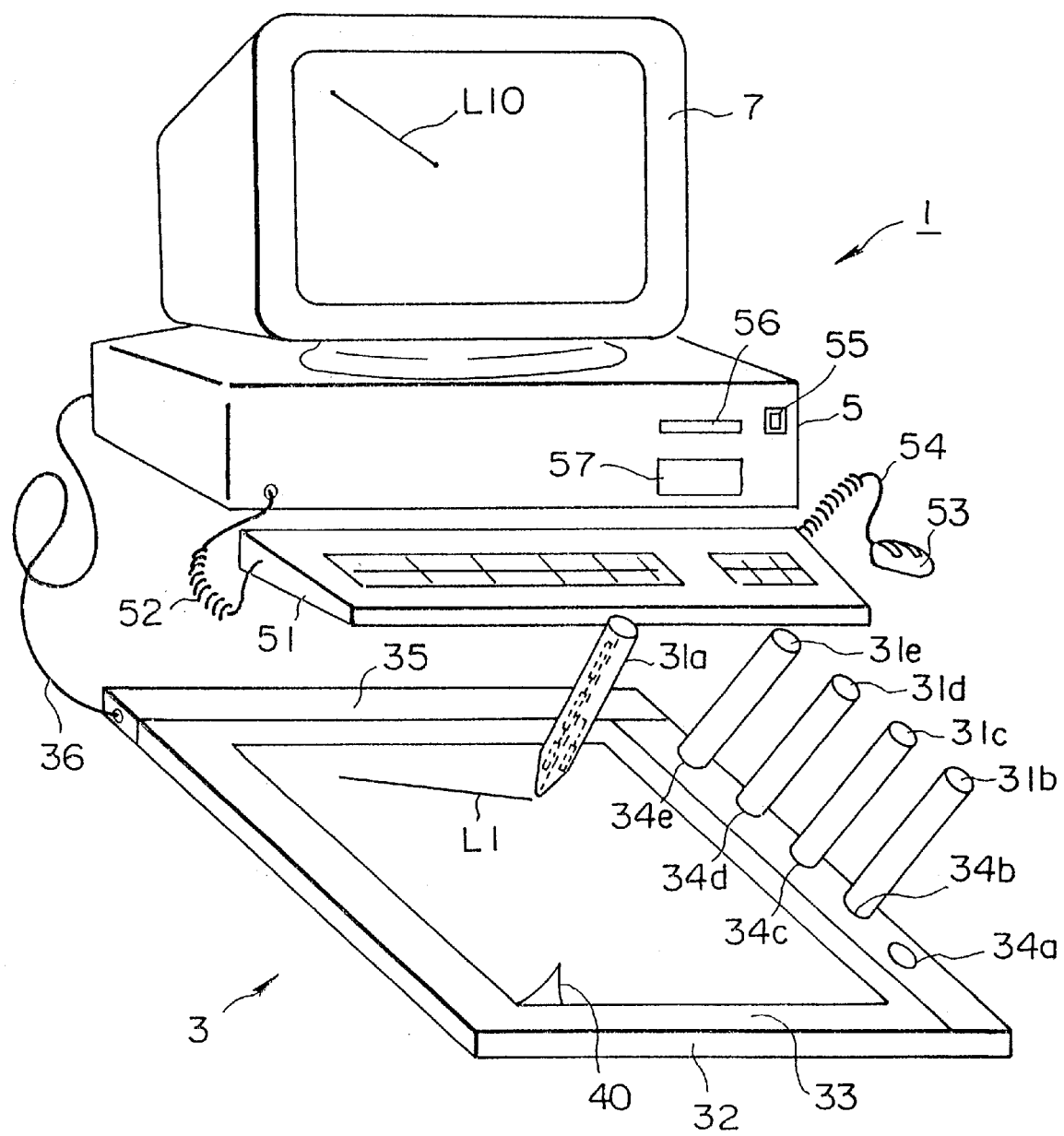
FIG. 1 is a perspective view of an image processing system as a first embodiment of the present invention.

An image processing system as a first embodiment of the present invention will be described below with reference to FIGS. 1–6. FIG. 1 is a perspective view of the image processing system.

The image processing system 1 roughly includes a data input device 3, an image processor 5 which performs an image process on an input signal from the data input device 3, and a display 7 which displays the results of the image processing performed by the image processor 5.

The data input device 3 includes, for example, a pen-like input unit 31a which produces a frequency signal inherent to the input unit 31a, a panel 32 which detects the frequency responsive to a touch of the input unit 31a to the panel and detects the position of data input by the input unit 31a. The panel 32 has a flat structure on a fixed area 33 of which, for example, a paper sheet 40 is placeable. EM loops are disposed along X and Y orthogonal axes (not shown) below the fixed area 33. The paper sheet 40 provides a picture drawing area on which, for example, a line L1 is drawable by the input units 31a. Provided in the shown right-hand end of the panel 32 are a plurality of holes 34a, 34b, 34c, 34d and 34e in which the pen-like input units 31a, 31b, 31c, 31d and 31e are placed. A main controller 35 is provided at the top of the shown panel 32 and connected to the image processor 5 through a cable 36.

The image processor 5 input terminals connected through a cable 52 to a keyboard 51. A mouse 53 is connected through a cable 54 to the keyboard 51. Display output terminals of the image processor 5 are connected through a cable (not shown) to the display 7.

The image processor 5 includes a power supply switch 55, a floppy disc drive 56, for example of a 3.5 inch size, and a CD-ROM drive 57.

Figure 2:
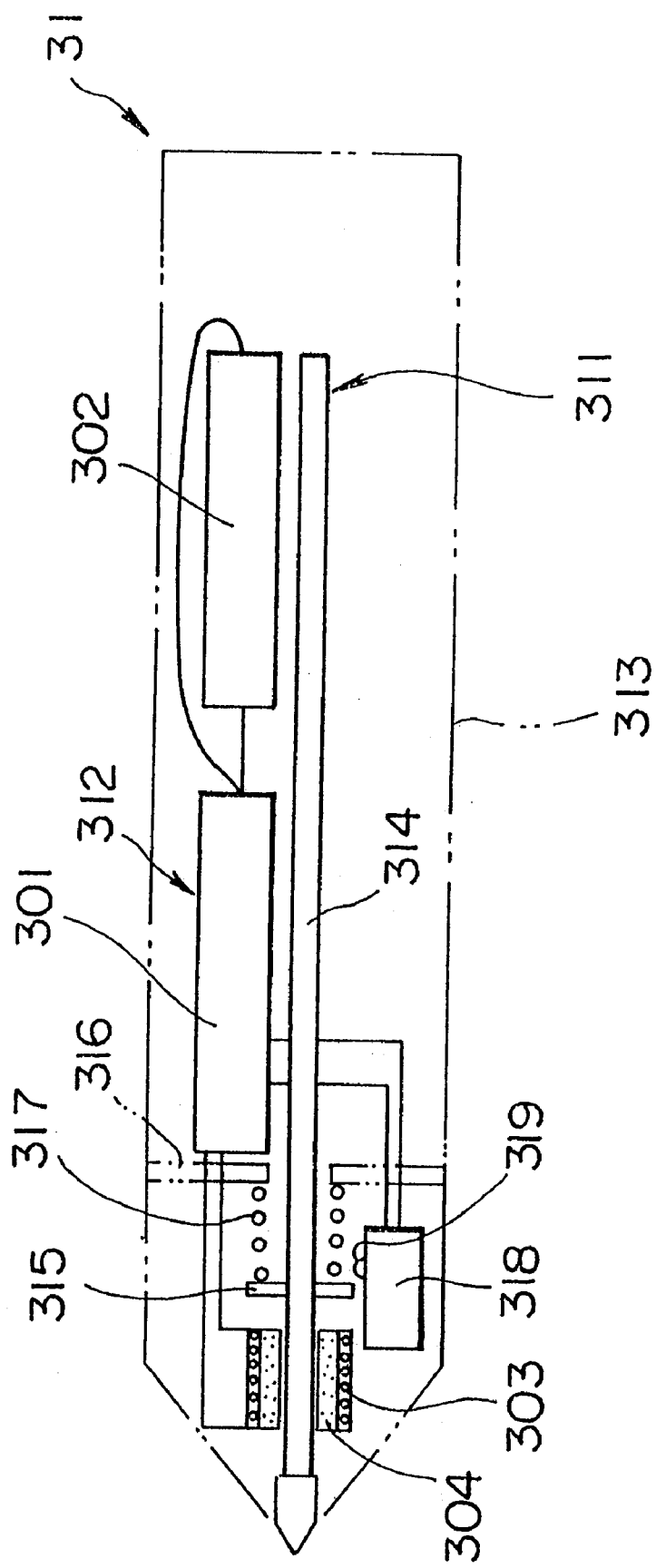
FIG. 2 illustrates one example of the structure of pen-like input means used in the image processing system.
Figure 3A:
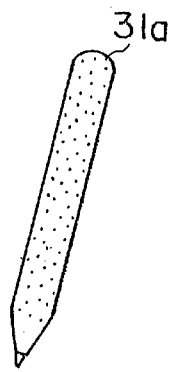
FIGS. 3A to 3E show a plurality of input means used in the image processing system.
Figure 3B:
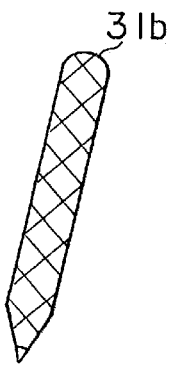
Figure 3C:
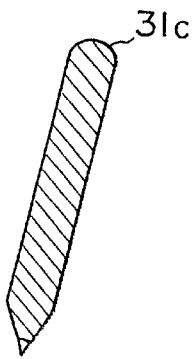
Figure 3D:
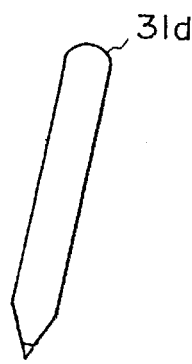
Figure 3E:
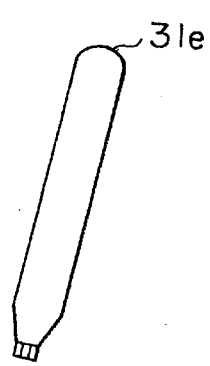

FIG. 2 illustrates one example of the structure of the pen-like input unit used in the image processing system. The input units 31a, 31b, 31c, 31d and 31e are the same in basic structure, so that they will be explained typically as the input unit 31.

This pen-like input unit 31 includes a writing instrument 311 which is capable of drawing an image, for example, on a sheet of paper, an oscillator 312 which oscillates at a frequency depending on the color of the writing instrument 311, and a pen-like housing 313 which contains those elements.

The writing instrument 311 is composed, for example of a ball fountain pen 314, a collar 315 provided near a tip of the ball fountain pan 314, a coil spring 317 provided between the collar 315 and a housing stop 316. Thus, when the input unit 31 is pressed on the panel 32 with a constant (writing) pressure, the ball fountain pen 314 moves upward against the resiliency of the coil spring 317. When the collar 315 of the pen 314 moves, a movable contact of a micro switch 318 of the oscillator 312 is depressed.

The oscillator 312 is composed of an oscillating circuit 301, a battery 302, an antenna coil 303, and the micro switch 318. The oscillating circuit 301 generates an oscillating frequency f1 allocated to the input unit 31. When the micro switch 318 is turned on, the oscillating circuit 301 oscillates at a frequency f2. A changing unit which changes the oscillating frequency from frequency f1 to f2 is composed of the color 315, housing stop 316, coil spring 317, micro switch 318 and predetermined elements of the oscillating circuit 301. The output from the oscillating circuit 301 is fed to the antenna coil 303, which radiates radio waves from the tip of the ball fountain pen 314. A cylindrical ferrite core 304 is disposed coaxially within the antenna coil 303. The oscillating circuit 301 is supplied with power from the battery 302.

Figure 4:
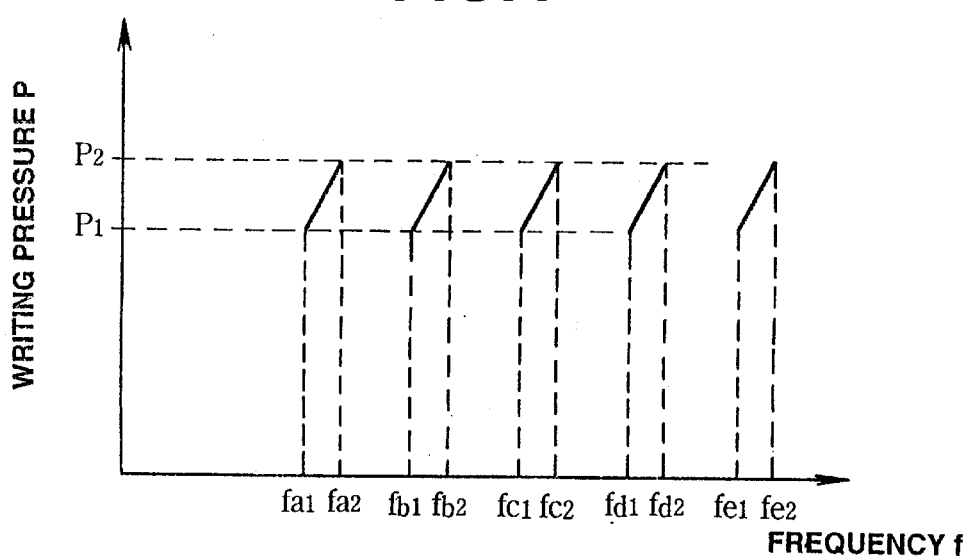
FIG. 4 illustrates the relationship between the frequencies generated by the respective input means.

FIG. 3 shows the respective input units. FIG. 4 illustrates the relationship between frequencies produced by the respective input units with horizontal and vertical axes representing frequency f and writing pressure P, respectively.

FIGS. 3A, 3B, 3C, 3D and 3E show pen-like input units 31a, 31b, 31c, 31d and 31e which are capable of drawing a picture or writing letters in red, blue, yellow, black (thin line) and black (thick line), respectively.

As shown in FIG. 4, the input unit 31a produces an oscillating frequency $f_{a1}$ at a writing pressure of P1 and outputs corresponding radio waves of a frequency $f_{a1}$ and an oscillating frequency $f_{a2}$ at a writing pressure of P2 and outputs corresponding radio waves of a frequency $f_{a2}$.

As shown in FIG. 4, the input unit 31b produces an oscillating frequency $f_{b1}$ at a writing pressure of P1 and outputs corresponding radio waves of a frequency $f_{b1}$, and an oscillating frequency $f_{b2}$ at a writing pressure of P2 and outputs corresponding radio waves of a frequency $f_{b2}$.

As shown in FIG. 4, the input unit 31c produces an oscillating frequency $f_{c1}$ at a writing pressure of P1 and outputs corresponding radio waves of a frequency $f_{c1}$, and an oscillating frequency $f_{c2}$ at a writing pressure of P2 and outputs corresponding radio waves of a frequency $f_{c2}$.

As shown in FIG. 4, the input unit 31d produces an oscillating frequency $f_{d1}$ at a writing pressure of P1 and outputs corresponding radio waves of a frequency $f_{d1}$, and an oscillating frequency $f_{d2}$ at a writing pressure of P2 and outputs corresponding radio waves of a frequency $f_{d2}$.

As shown in FIG. 4, the input unit 31e produces an oscillating frequency $f_{e1}$ at a writing pressure of P1 and outputs corresponding radio waves of a frequency $f_{e1}$, and an oscillating frequency $f_{e2}$ at a writing pressure of P2 and outputs corresponding radio waves of a frequency $f_{e2}$.

Figure 5:
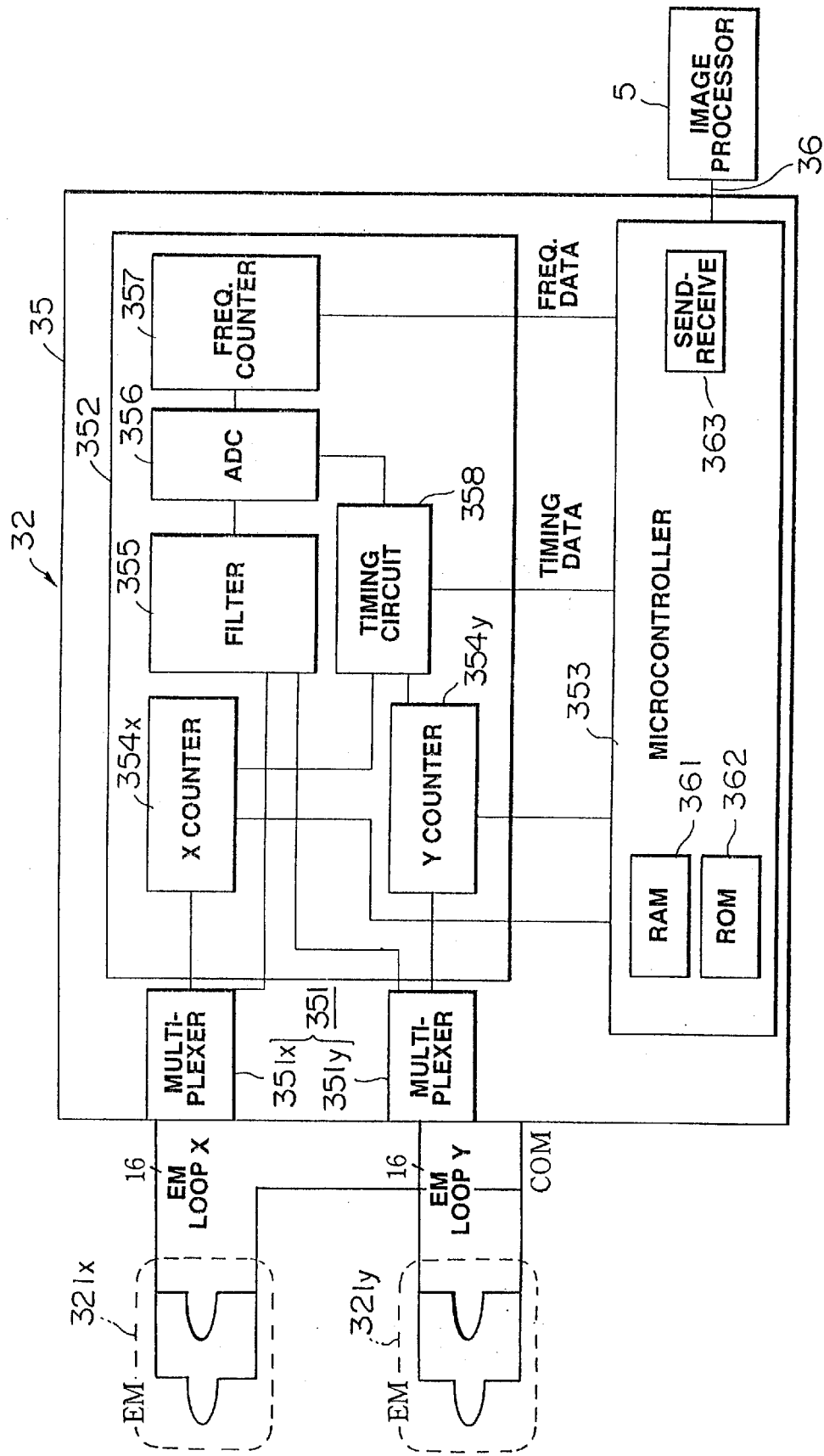
FIG. 5 is block diagram of a main controller of a panel used in the image processing system.

FIG. 5 is a block diagram of the main controller 35 of the panel used in the image processing system. The main controller 35 roughly includes a multiplexer 351 and a signal processor 352, and a microcontroller 353.

The multiplexer 351 is composed of an X-axis multiplexer 351x and a Y-axis multiplexer 351y.

The signal processor 352 is composed of an X counter 354x, a Y counter 354y, a filter 355, an analog-to-digital converter (ADC) 356, a frequency counter 357 and a timing circuit 358.

The multiplexer 351x selects, for example, one of 16 X-axis EM loops 321x. The multiplexer 351y selects, for example, one of 16 Y-axis EM loops 321y.

The X counter 354x produces a positional signal representative of a position on the X axis. The Y counter 354y produces a positional signal representative of a position on the Y axis.

The filter 355 filters out unnecessary components from the input signal and delivers the resulting extracted signal to ADC 356, which converts the extracted analog signal to a digital signal. The digital signal is then counted by a frequency counter 357 to provide a frequency signal.

The timing circuit 358 times the X counter 354x, Y counter 354y and ADC 356 on the basis of timing data from the microcontroller 353.

The microcontroller 353 is composed, for example, of a microcomputer which includes a RAM 361, a ROM 362, and a send/receive unit 363. The microcontroller 353 is connected through a cable 36 to the image processor 5.

For example, 16 EM loops 321x and 16 EM loops 321y are disposed along the XY orthogonal axes below the fixed area 33 of the panel 32.

The operation of the first embodiment will be described below with reference to FIG. 6, which is a flow chart indicative of the image processing operation performed by the image processor.

Figure 6:
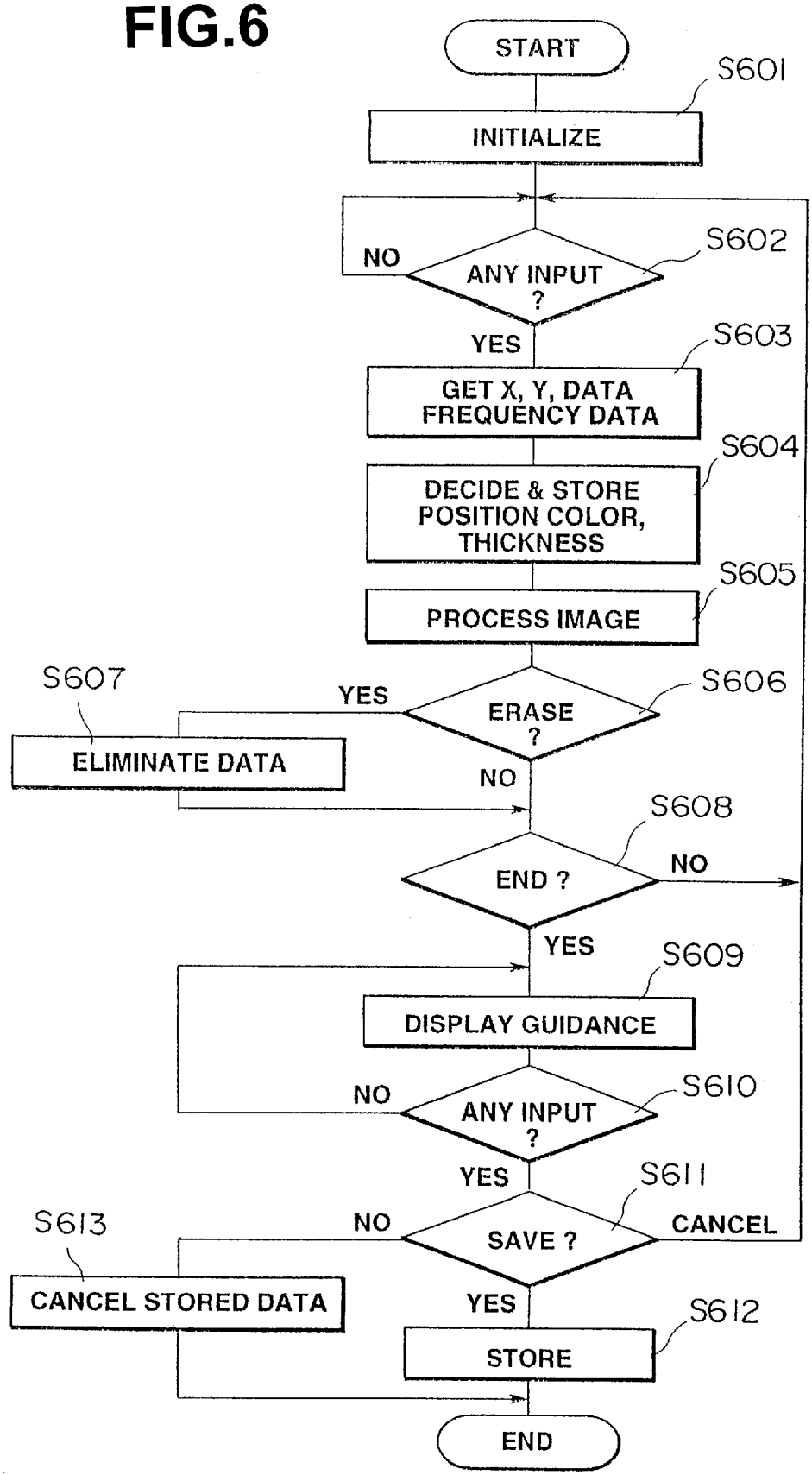
FIG. 6 is a flow chart indicative of an image processing operation performed in the image processing system.

First, when the drawing program is started, the image processor 5 executes a process in accordance with the flow chart of FIG. 6. First, the image processor 5 performs an initializing operation (step S601). Thus, a picture indicative of an input wait state appears on the display 7.

The microcontroller 353 then determines whether there is any input from the panel 32 (S602). If not (NO at step S602), control then passes to the input wait state.

Assume now that the operator draws a red line L1 on a drawing area, for example, of a paper sheet 40 with an input unit 31a, as shown in FIG. 1. In response to this operation, an input signal indicative of the line L1 is formed on the pane 32. Momentary positional signals representative of points on the line L1 on the XY axes are output from the X counter 354x and Y counter 354y. Also, the frequency counter 357 outputs a frequency signal. Those signals are processed by the microcontroller 353 and delivered to the image processor 5, which, when there is an input (YES at step S602), gets the momentary XY positional signals and the frequency signal and processes them (S603). That is, the image processor 5 determines and stores the display position, color or the thickness of the line on the basis of the XY positional signals and frequency signal (S604). The microcontroller 353 delivers the resulting signal from the image processor 5 in the form of a video signal to the display 7 (S605). Thus, a predetermined color (in this case, red) is displayed at an appropriate instantly changing position on the display 7 screen.

If an eraser signal is inputted (YES at step S606), the data at the appropriate eraser position is erased (S607). If not, (NO at S606), the microcontroller 353 determines whether the drawing should end (S608).

Usually, when the operator is drawing line L1 with the input unit 31a, the process does not end (NO at S608), so that control again passes to the input wait state at S602. Since the operator is drawing line L1 with the input unit 31a, the steps S602–S608 are repeated. Thus, a red line L10 is drawn on the display screen 7 like line L1 drawn on the paper sheet 40 placed on the fixed area 33 of the panel 32.

When the process ends (YES at S608), the image processor 5 displays a guidance screen for terminating the display screen (S609), and control passes to the input wait state (NO at S610-S609).

Viewing the guidance screen, the operator stores the image data stored, for example, in the display memory into a predetermined storage to update same (S612) if the data is to be saved (YES at S610-YES at S611). If data saving is not desired (YES at S610-NO at S611), the image processor 5 erases the image data stored in the display memory (S613). When saving is to be canceled (YES at S610-CANCEL at S611), the control returns to step S602.

By changing the input unit from 31a to 31b, blue dots and/or lines can be drawn, for example, on a paper sheet 40. Thus, positional signals and a color signal representative of blue dots and lines are delivered from the controller 35 of the panel 32 to the image processor 5. Thus, blue dots and lines are drawn on the display screen 7.

By changing the input unit from 31b to 31c, yellow dots and/or lines can be drawn, for example, on the paper sheet 40. Thus, positional signals and a color signal representative of yellow dots and lines are delivered from the controller 35 of the panel 32 to the image processor 5. Thus, yellow dots and lines are drawn on the display screen 7.

By changing the input unit from 31c to 31d, black small dots and/or thin lines can be drawn, for example, on the paper sheet 40. Thus, positional signals representative of black small dots and black thin lines and a signal representative of the type of the pen (specified by the frequency concerned) are delivered from the controller 35 of the panel 32 to the image processor 5. Thus, black small dots and black thin lines are drawn on the display screen 7.

By changing the input unit from 31d to 31e, black large dots and/or black thick lines can be drawn, for example, on the paper sheet 40. Thus, positional signals representative of black large dots and black thick lines and a signal representative of the type of the pen (specified by the frequency concerned) are delivered from the controller 35 of the panel 32 to the image processor 5. Thus, black large dots and black thick lines are drawn on the display screen 7.

As described above, according to the first embodiment, characters, symbols, figures, etc., are drawn in various colors and in various thicknesses on the drawing area of the paper sheet 40 with the pen-like input unit 31a–31e and the corresponding images are displayed on the display 7.

While in the first embodiment the input unit 31 includes the oscillator and the panel 32 detects positional and frequency of the input unit 31, arrangement may be such that the panel 32 switchingly sends the respective ones of a plurality of frequencies to the X and Y loops, a predetermined frequency alone is detected by a resonator provided in each input unit 31, the frequency detected by the input unit 31 is used as information on the identification of the type and color of the input unit 31 and the position on the X- and Y-axis plane is determined on the basis of a point of time when the frequency is detected.

The input unit 31 is provided for each of the functions prepared in the software used in the embodiment 1. Thus, an eraser-like button switch may be prepared in correspondence to the erasure function of FIG. 6. As just described above, the input units are provided in correspondence to the respective set functions. Each input unit has a form and/or structure which suggests the inputting function thereof. In an embodiment of the present invention to be described later, a doll-like imput unit is employed in place of the pen-like input unit.

Second Embodiment

A second embodiment of the present invention will be described next with reference to FIGS. 7–10, which is a perspective view of the second embodiment of the image processing system.

Figure 7:
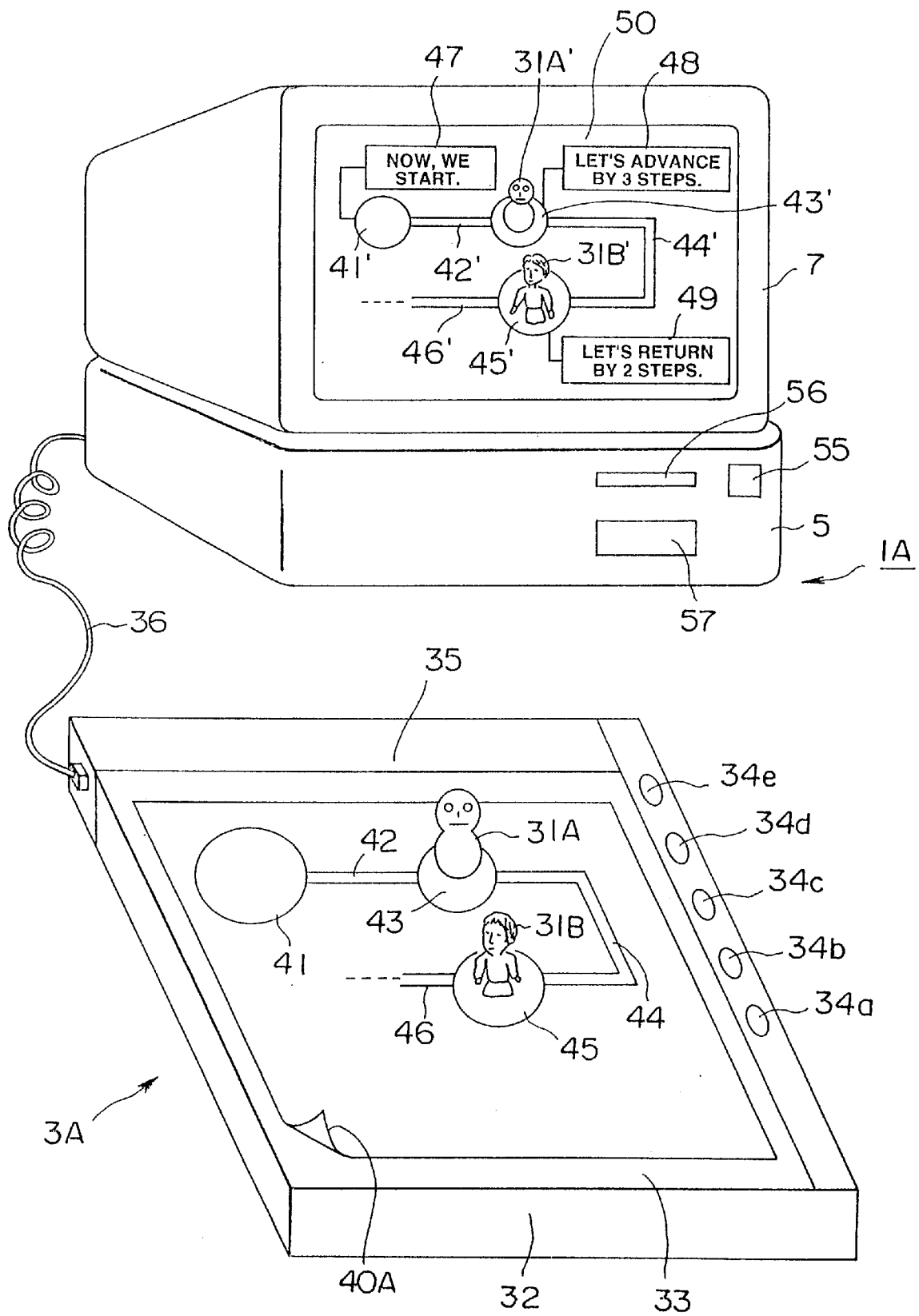
FIG. 7 is a perspective view of an image processing system as a second embodiment.

The image processing system 1A of FIG. 7 uses doll-like input units 31A, 31B, instead of the pen-like input unit 31. The same reference numeral is used to denote similar elements of the first and second embodiments and their further description will be omitted.

The image processing system 1A is capable of performing an image process, for example, concerning a game with a die. To this end, first, a game paper sheet 40A on which positions 41, 43, 45, . . . and lines 42, 44, 46, . . . which connect those positions are printed is placed on the fixed area 33 of the panel 32. When a predetermined function key (not shown) is depressed, a game picture 50 is displayed on display 7. The game picture 50 is composed of positions 41', 43', 45', . . . and lines 42', 44', 46', . . . which connect those positions.

Players cast a die (not shown) and move the doll-like input units 31A, 31B through the positions 41, 43, 45, . . . on the paper sheet 40A. Thus, guidance matters 47, 48, 49 in the respective positions 41', 43', 45', . . . are displayed on display 7, and characters 31A', 31B' corresponding to the doll-like input units 31A, 31B are displayed.

Figure 8:
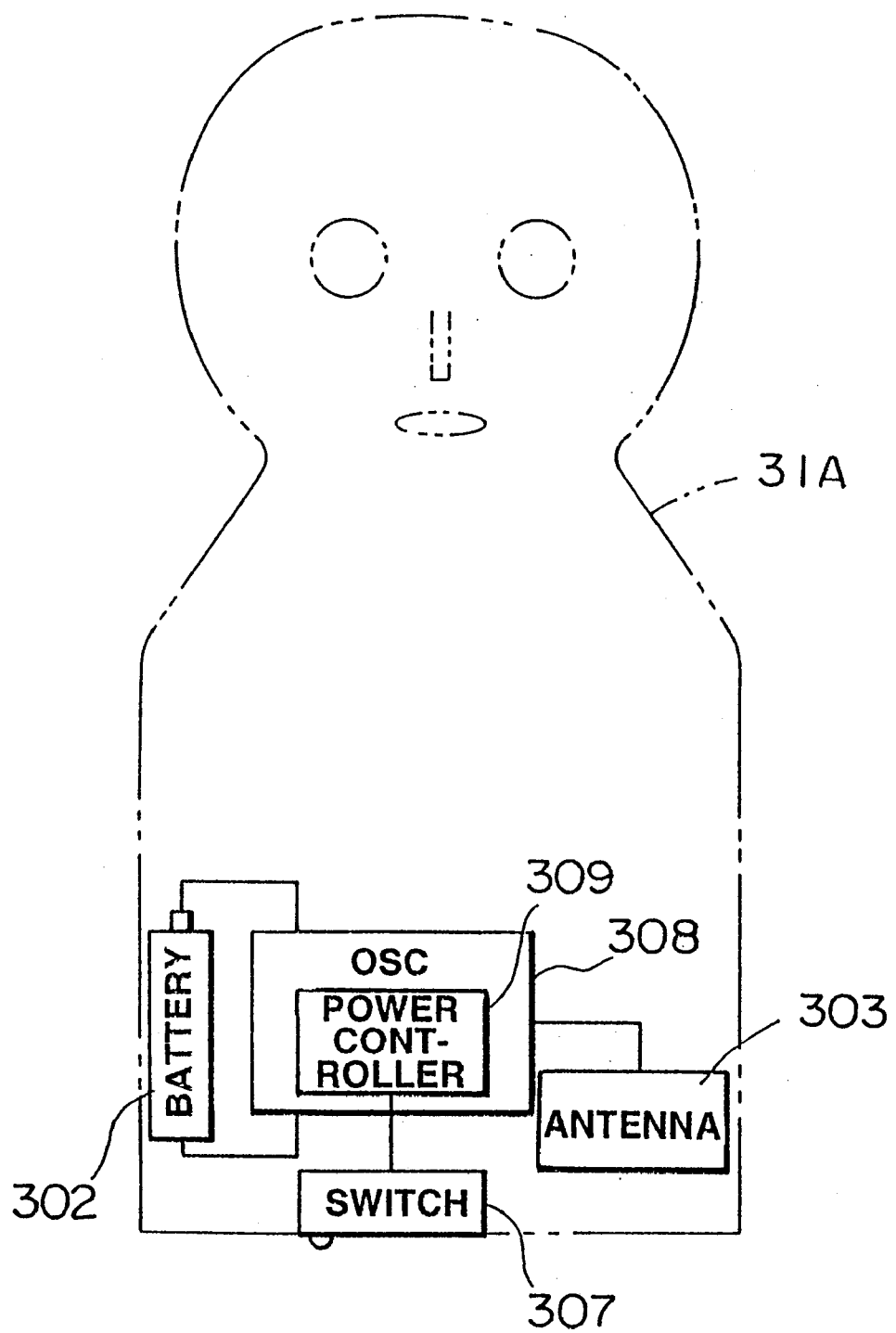
FIG. 8 is a block diagram of a doll-like input means used in the second embodiment.

FIG. 8 is a block diagram of the doll-like input unit. An oscillator 308 is composed of an oscillating circuit (not shown) and a power supply controller 309. The power supply controller 309 supplies power to the oscillating circuit from a battery 302 for a fixed period of time after a switch 309 is turned on. The output from the oscillator 308 is supplied to the antenna coil 303.

Figure 9:
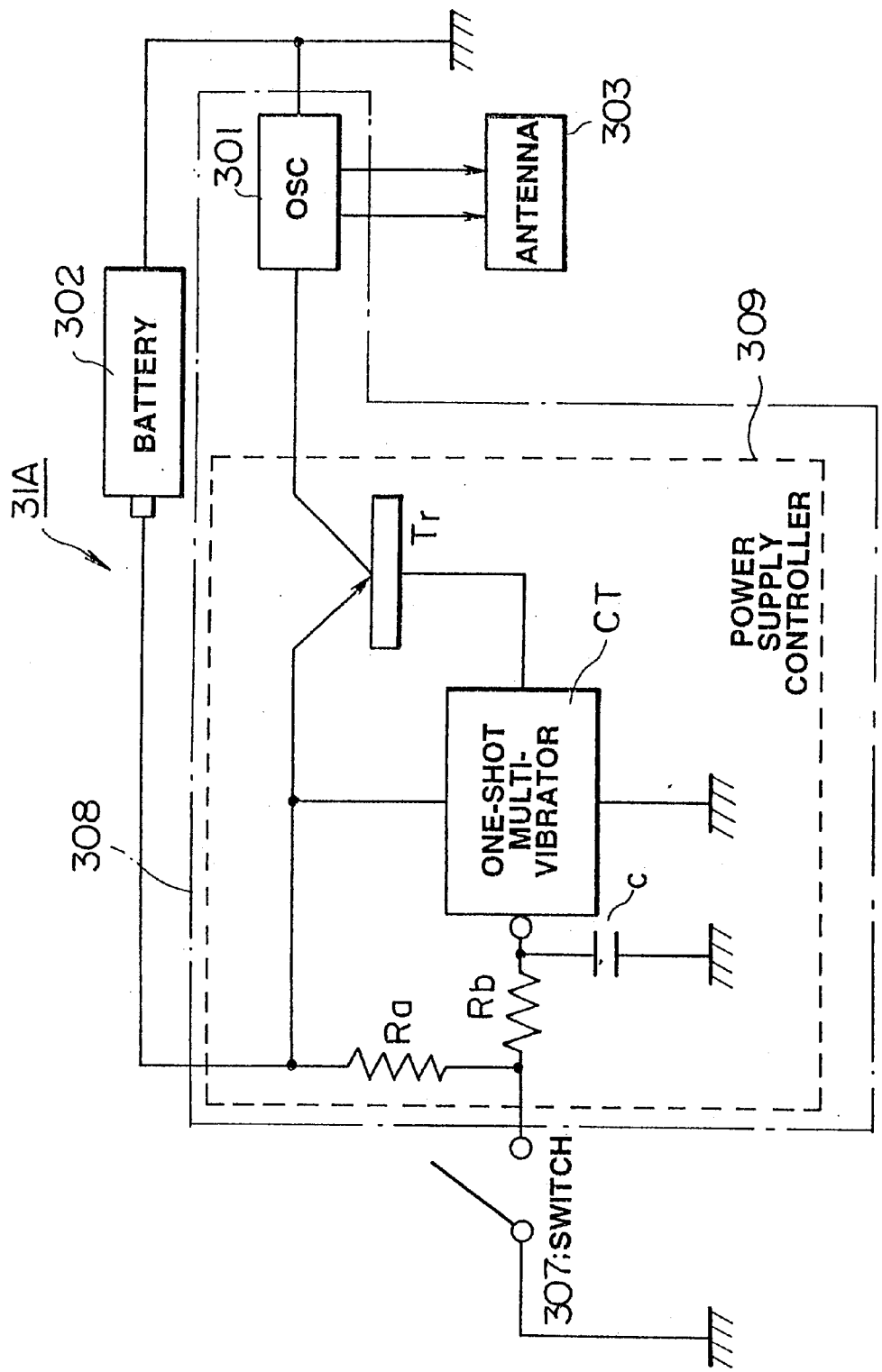
FIG. 9 is a block diagram of an electrical system used in the doll-like input means.
Figure 10:
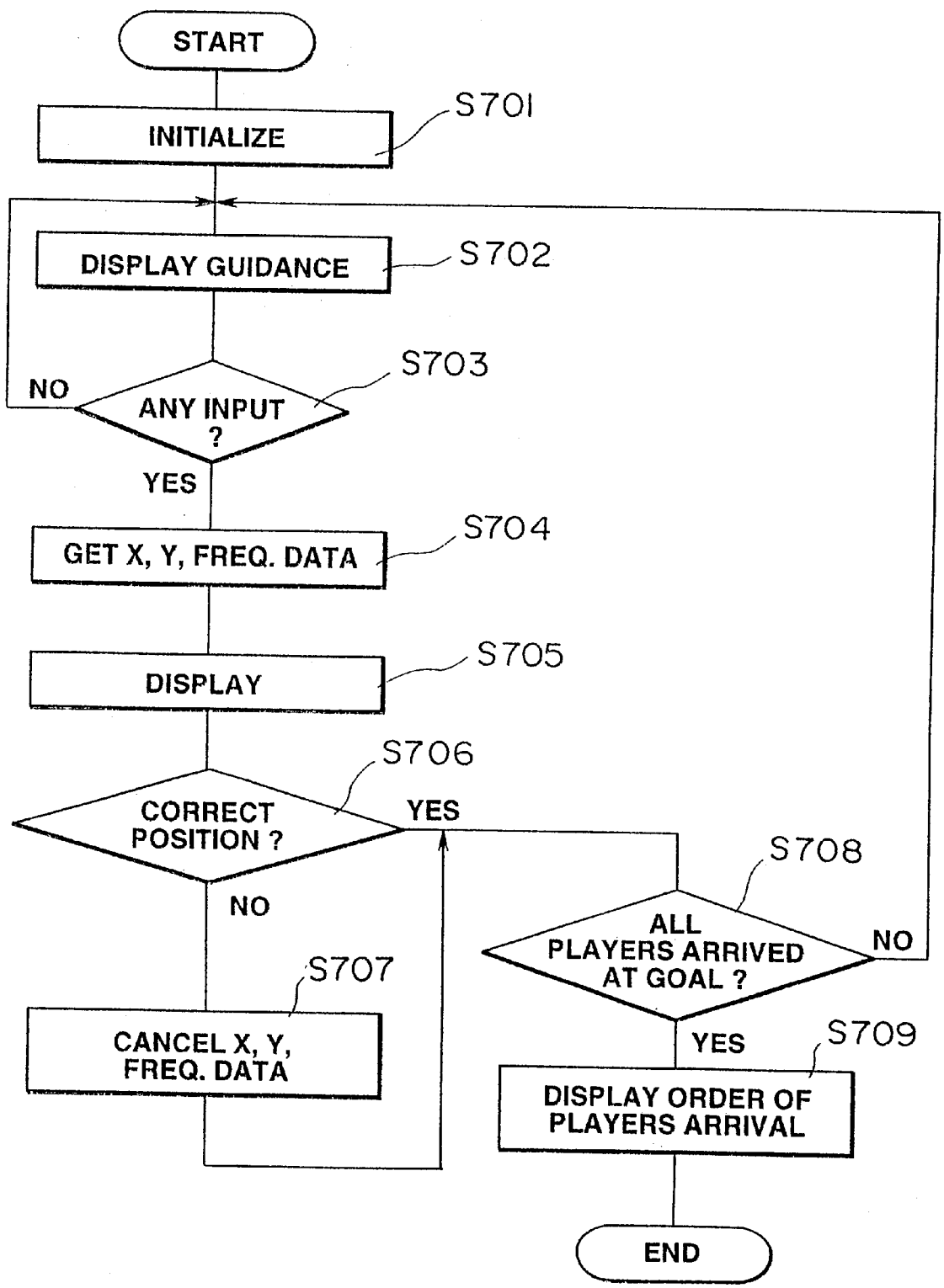
FIG. 10 is a flow chart indicative of the operation of the image processor as the second embodiment.

FIG. 9 is a block diagram of an electrical system of the doll-like input unit. In FIG. 9, the doll-like input units 31A and 31B have basically the same structure, so that the input unit 31A will be described typically.

The input unit 31A is constituted as follows. The positive electrode of the battery 302 is connected to one end of a resistor Ra, a positive power supply terminal of a one-shot multivibrator CT, and an emitter of a transistor Tr. The negative electrode of the battery 302 is grounded. The collector of the transistor Tr is connected to the positive power supply terminal of the oscillating circuit 301, the negative power supply terminal of which is grounded. The output terminals of the oscillating circuit 301 are connected to the antenna coil 303. The base of transistor Tr is connected to the output terminal of the one shot multivibrator CT, the negative power supply terminal of which is grounded. The resistor Ra is connected at the other end to one end of each of a switch 307, which is turned on when the input unit 31A is placed in an upstanding state, and a resistor Rb. The other end of resistor Rb is connected to the inverting input terminal of the one shot multivibrator CT and one end of a capacitor C, the other end of which is grounded with the other end of the switch 307 being grounded.

The register Ra is a pull-up one. The resistor Rb and the capacitor C constitute a chattering preventive filter for the switch 307. When the switch 307 is turned on, the inverting input terminal of the one shot multivibrator CT becomes "0" to start up the one shot multivibrator CT. Thus, the one shot multivibrator CT outputs "1". Thus, the base of the transistor Tr is impressed with a voltage to turn the transistor on. Thus, the oscillating circuit 301 is powered up to oscillate at a predetermined frequency which is delivered to the antenna coil 303.

When a predetermined period of time has elapsed, the one shot multivibrator CT of the input unit 31A becomes inoperable even when the switch 307 is on, and outputs "0" at its output terminal. Thus, the transistor Tr is turned off and supply of power to the oscillating circuit 301 is interrupted to stop the oscillation of the oscillating circuit 301.

Thus, the respective input units 31A and 31B output the frequencies allocated thereto until a predetermined period of time elapses from the time when the input units 31a, 31b are placed on the fixed area 33 of the panel 32. Thereafter, no frequencies are output as long as the input units 31A and 31B are not placed at other points either on the game paper sheet 40A or on the same place.

The panel 32 is capable of obtaining signals to specify the types and positions of the input units 31A and 31B on the basis of frequencies from the input units 31A and 31b. The operation of the second embodiment having such structure will be described with reference to a flow chart of FIG. 10 indicative of the operation of the image processor 5.

A game paper sheet 40A on which game positions 41, 43, 45, . . . and lines 42, 44, 46, . . . which connect those positions are printed is placed on the fixed area 33 of the panel 32. When the predetermined function key (not shown) is depressed, the image processor 5 performs an image processing operation in accordance with the flow chart of FIG. 10. First, the image processor 5 performs initialization required for the subsequent image processing operations (S701). The image processor 5 forms a dice game picture 50, delivers its data to the display 7 (S702), and then enters an input wait state (NO at S703-S702). Thus, the dice game display screen 50 is displayed on the display 7. The display screen 50 displays positions 41', 43', 45', . . . and lines 42', 44', 46', . . . which connect those positions, as shown in FIG. 7.

The players then cast the die (not shown) and move the input units 31A, 31B through the positions 41, 43, 45, . . . on the game paper sheet 40A.

When the input unit 31A is placed in the position 43 on the game paper sheet 40A, the input unit 31A outputs the frequency allocated thereto for a predetermined period of time. When the switch 307 is turned on, the inverting input terminal of the one shot multivibrator CT becomes "0" and thus the output terminal of the one shot multivibrator CT becomes "1" for the predetermined period of time for which the transistor Tr is on to supply power to the oscillating circuit 301. Thus, the oscillating circuit 301 supplies the oscillating frequency to the antenna coil 303, the frequency from which is detected by the EM loops 321x and 321y of FIG. 5 in the panel 32 and processed by the signal processor 352. The microcontroller 353 delivers the position signals and frequency signal on the basis of the processed signal to the image processor 5. When a predetermined period of time has elapsed from the time when, for example, the input unit 31A is placed in the predetermined position 43, the input unit 31A stops outputting the frequency due to the operation of the power supply controller 309.

As described above, when the panel 32 detects the frequency from the input unit 31A, it delivers the frequency to the image processor 5. Thus, the image processor 5 determines that there was any input signal (YES at S703), and gets and processes the XY positional signals and the frequency signal (S704). Assume, for example, that the input unit 31A is placed in the position 43. In this case, signals indicative of this position and the frequency are detected by the panel 32 which then delivers the signals to the image processor 5. The image processor 5 then determines that the input unit is 31A, creates data to display character 31A' in the position 43' and predetermined guidance data, and delivers those data to display 7 (S705). Thus, a sentence "Let's advance by three steps" is displayed on the guidance screen 48 of the display screen 50.

If the input unit 31A is not placed at a proper position (NO at S706), the image processor cancels the XY position signals and frequency data (S707). If the input unit 31A is placed at the proper position (YES at step S706), the image processor determines that all the players have arrived at the goal without doing anything (S708).

If not (NO at S708), the image processor again performs the process at step S702. Thus, for example, when the input unit 31B is disposed in the position 45, a character 31B' corresponding to the input unit 31B is displayed along with the guidance screen 49 "Let's return by two steps" on the display screen 50, as shown in FIG. 7.

When all the players arrive at the goal (YES, at S708), the image processor 5 performs a display process concerning the order of arrival of the input units 31A and 31B and delivers the resulting data to the display 7 (S709). Thus, the order of arrival of characters 31A' and 31B' corresponding to the input units 31A and 31B is displayed on the display screen 50.

According to the second embodiment, the game can be enjoyed by placing the predetermined game paper sheet 40A on the fixed area 33 of the panel 32 and using the input unit 31A and 31B, . . . By using the image input unit, an image or the like can be written as well as the game can be enjoyed, using the game paper sheet 40A. In addition, by using an educational paper sheet or the like, the contents of education based on the position of the input unit can be displayed on the display. That is, a variety of usage is provided.

Third Embodiment

Figure 11:
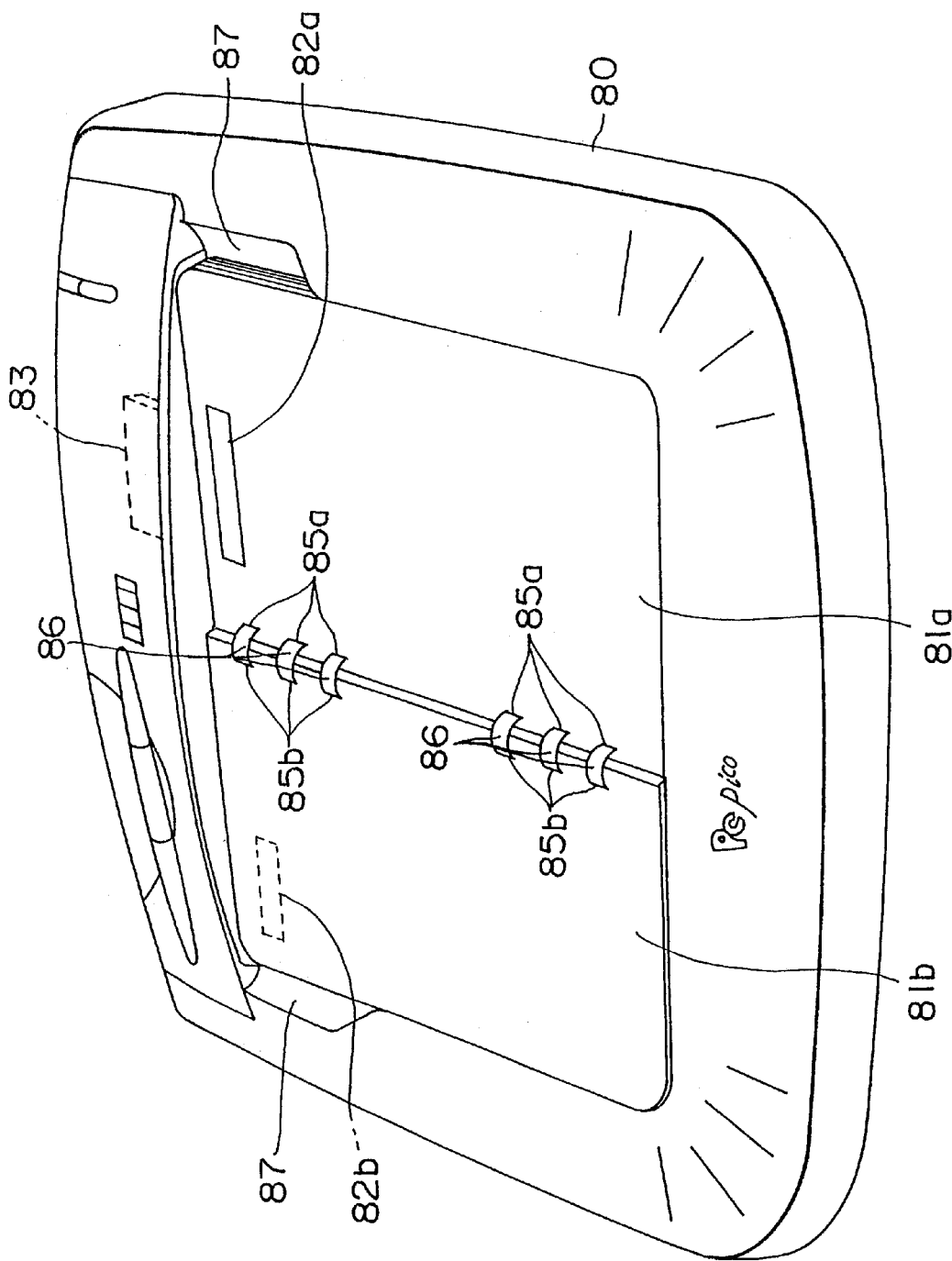
FIG. 11 is a perspective view of a data input device of an image processing system as a third embodiment.
Figure 12:
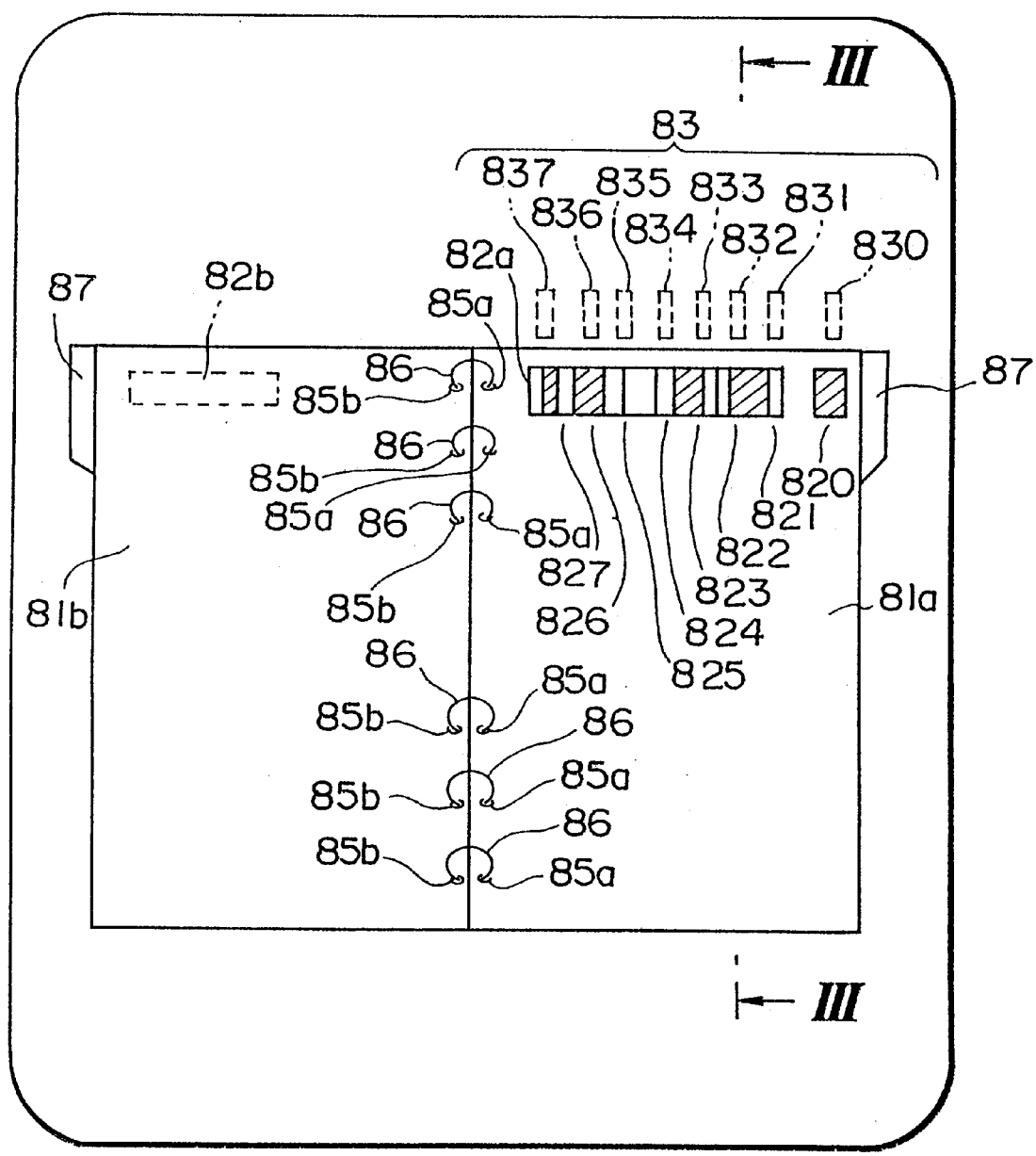
FIG. 12 is a plan view of the third embodiment.
Figure 13:
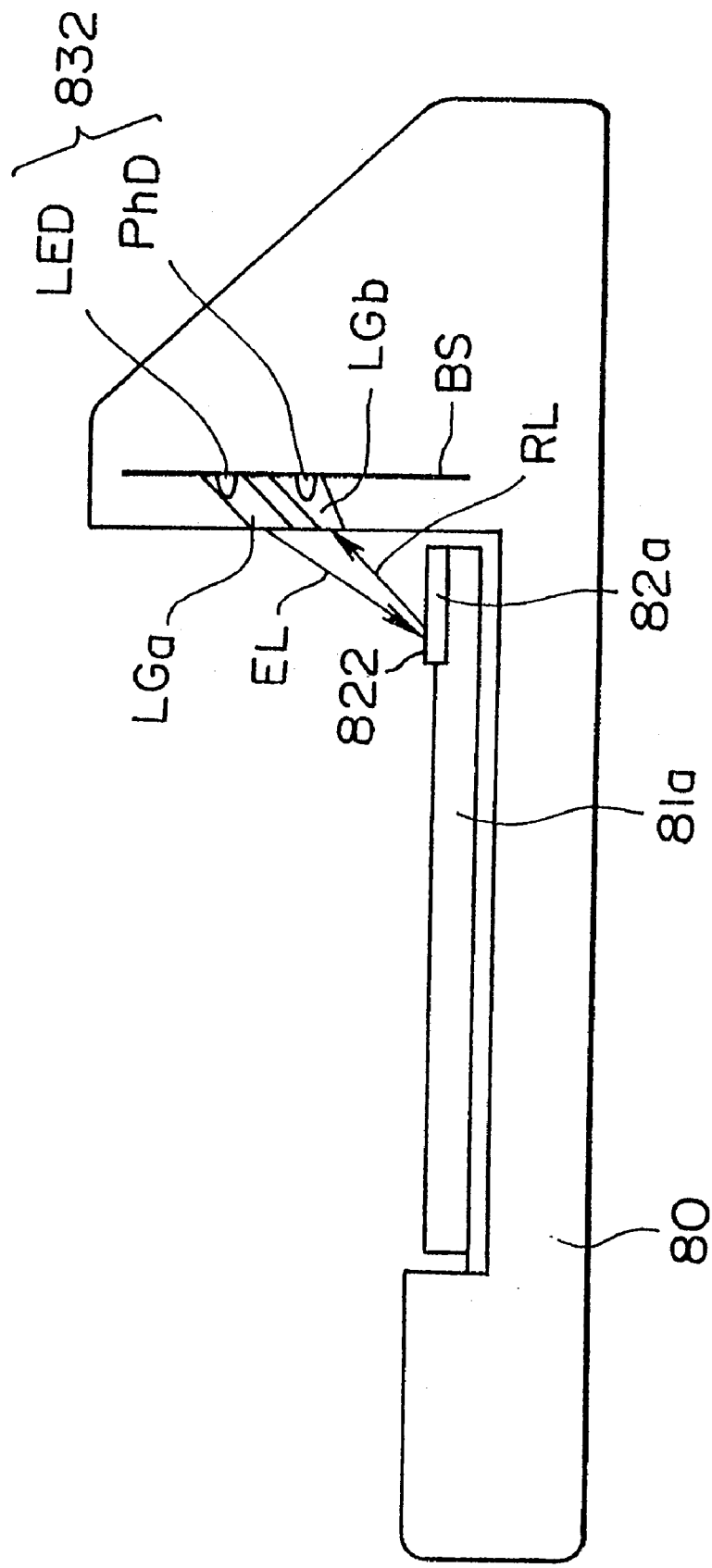
FIG. 13 is a cross-sectional view taken along the line III—III in FIG. 12.

FIGS. 11–13 illustrates a third embodiment of the present invention directed to a data input device for inputting data to an image processor. The data input device includes a plurality of cards, on which predetermined data are recorded held openable hingedly by a plurality of holding hooks of the device body inserted through holes provided along an edge of the cards and forms, and outputs to the processor, data to specify the contents of the data recorded on the respective cards on the basis of the contents of the recorded data. This data input device is characterized in that a bar code is formed on an upper portion of each card which specifies the contents of the data recorded on the bar code on the basis of the contents of the recorded data and that a reader is provided on the body of the input device for reading information on the bar code.

Thus, according to this data input device, the reader reads the bar code appearing on the upper portion of the card open at present and outputs a corresponding signal to specify the contents of the bar code recorded on the card. By delivering this signal to the image processor, the image processor performs various data processing operations, displays the result of processing or outputs same audibly.

The reader includes a plurality of optical readers each provided at a position facing a respective one of a series of recognition positions on the bar code. In the particular embodiment, the bar code contains seven recognition positions and seven corresponding optical readers are provided.

Each optical reader includes a light emitting element (for example, a light emitting diode) provided at a position facing a recognition position on the bar code for irradiating the recognition position with light, and a detection photodiode for receiving reflected light from the recognition position and for converting it to an electrical signal depending on the intensity of the reflected light on the recognition position.

The data input device will be then described more specifically with reference to the drawings.

FIG. 11 is a perspective view of the data input device. FIG. 12 is a plan view of the data input device. FIG. 13 is a cross-sectional view taken along the line III—III of FIG. 12.

The data input device includes a plurality of cards 81a, 81b, . . . attached hingedly on the device body 80 so as to be operable. The respective cards contain recorded matters thereon and bar codes 82a, 82b, . . . provided on the respective upper portions of the cards, and a reader 83 which reads, for example, bar code 82a provided on the upper portion of a card 81a open at present.

In more detail, holding hooks 86 are inserted through a plurality of holes 85a, 85b, . . . provided along one edge of cards 81a, 81b such that the respective cards 81a, 81b, . . . are operable hingedly. The bar codes 82a, 82b, . . . are dependent on the matters recorded in the respective cards.

Reader 83 is provided at a predetermined position on the body 80 of the data input device to read a bar code, for example, bar code 82a on the upper portion of the current open card 81a among the respective cards 81a, 81b, . . . Provided on each of the opposite sides of the body 80 is a recess 87 into which a finger is inserted to turn over the respective cards 81a, 81b, . . .

The reader 83 includes a plurality of optical reading units 830–837 provided at positions facing respective recognition positions 821–827 and a reference recognition position 820 on bar code 82A on the card 81A.

The optical reading units 830–837 have the same structure, so that the optical reading unit 832 will be described typically. In the optical reading unit 832, a light emitting diode (LED) is provided at a position on a base BS of the device body facing the recognition position 822 on the bar code 82a on the current open card 81a. The LED emits irradiates the appropriate recognition position 822 with light passing through an optical path LGa in the base BS. A detection photodiode PhD provided below the LED receives reflected light from the recognition position 822 through an optical path LGb in the base BS and converts it to an electrical signal.

A detection signal from the detection photodiode PhD of the optical reading unit 832 is compared with a detection signal from the photodetector diode PhD of the optical reading unit 830 for the reference recognition position 820. Of course, the respective detection signals from the other optical reading units 831–837 are compared with the detection signal from the photodetector diode PhD of the optical reading unit 830 for the reference recognition position 820. On the basis of the result of the comparison, the colors (white or black) at the respective recognition positions 821–827, for example, of the bar code 82a are determined and the contents of data recorded on a front surface of the card 81a and on the back surface of the card 81b are specified.

According to this data input device, the contents of data on the respective cards are specified by reading the corresponding bar codes on the cards to thereby provide specified contents of a large amount of information.

According to this data input device, the bar code is provided on the upper portion of the card, so that there in a reduced probability that a bar code will inadvertently be hidden by hand or others.

According to the data input device, the optical reading units are provided at positions corresponding to the recognition positions on a bar code, so that sensing means used in a conventional device which senses a bar code by optically scanning the bar code is not required to be provided.

In addition, according to this data input device, data which is specified with a bar code the contents of data recorded on a card is delivered to the image processor. Thus, the image processor is capable of providing various images and voices depending on the bar code concerned.

According to the present embodiment, a bar code is sensed, so that the input device is capable of identifying the ID of a book.

Fourth Embodiment

A fourth embodiment of the present invention will be described with reference to FIGS. 14–21. This embodiment is directed to a data input device which inputs data to the image processor. The input device takes a form similar to the third embodiment and is directed to improvements to means for detecting the current page (card).

Figure 14:
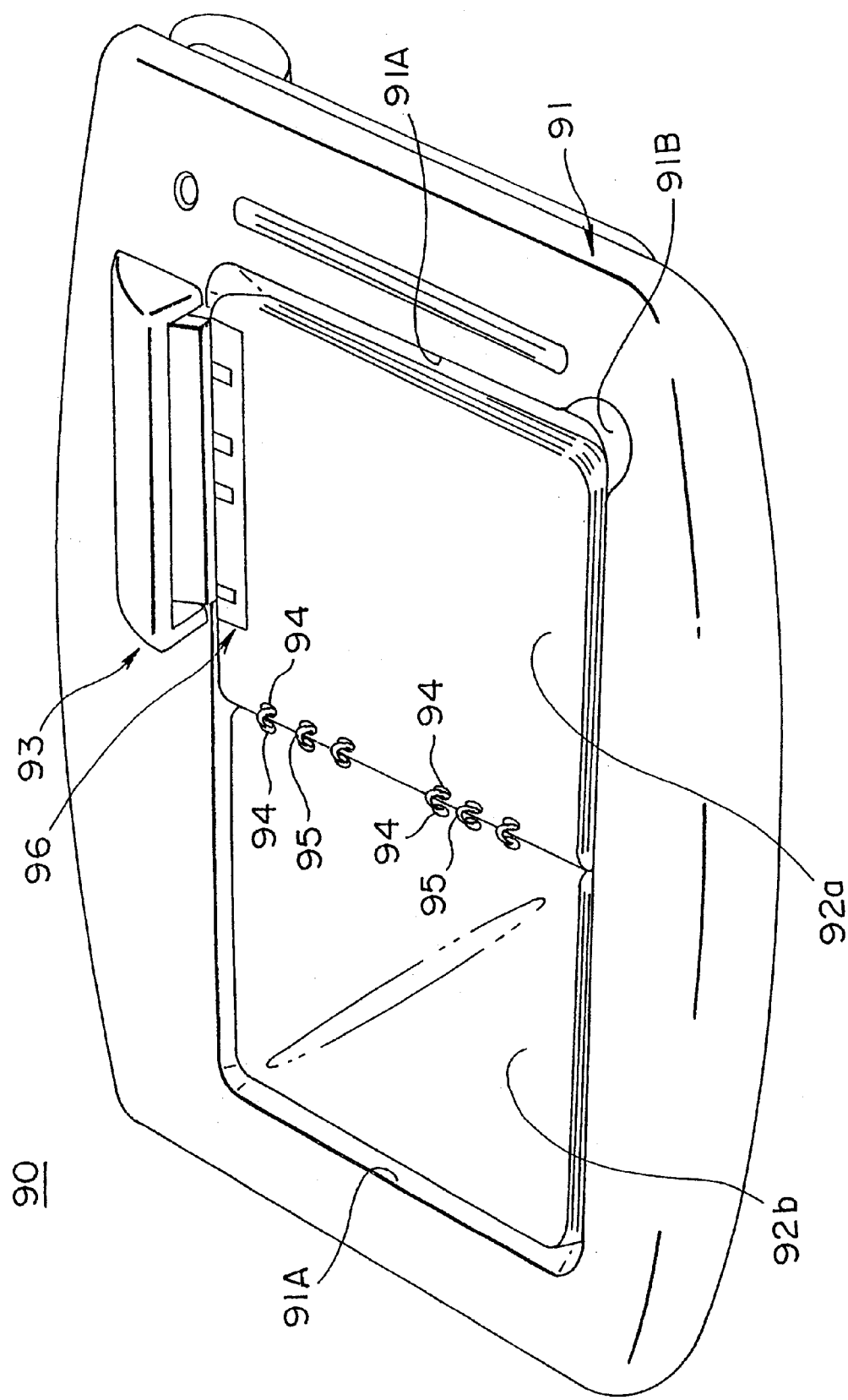
FIG. 14 is a perspective view of a data input device of an image processing system as a forth embodiment.

As shown in FIG. 14, the data input device 90 includes a panel-like body 91, a plurality of cards 92a, 92b, . . . attached openable hingedly in a substantially square recess 91A on the body 91, and a reader 93 attached at an upper right-hand portion of the body 91 for reading a binary code (page number) on the current open page, for example, card 92a.

The cards 92a, 92b, . . . are held openable hingedly by holding hooks 95 or holding rings of the body 91 inserted through a plurality of holes 94 provided along one of the card edge. In normal use, the cards 92a, 92b, . . . are opened from the right side of the body 91 to the left side. Thus, the current open page is positioned on the right-hand half of the body 91 with an exposed front. The card positioned on the left-hand half of the body 91 is closed with an exposed back. In FIG. 14, reference symbol 91B denotes a recess where a finger is to be inserted to turn the card over.

Predetermined data (on a picture, character information) are written on the respective front surfaces of the cards 92a, 92b, . . . and binary codes 96 representative of the page numbers of the cards are recorded by print on their upper portions. As will be described later, the reader 93 reads binary information on a binary code 96 in an optical non-contact manner. The binary code 96 may include information on the page, type of the card and its contents of description. The reader 93 detects a card page by reading its binary code 96.

Figure 15:
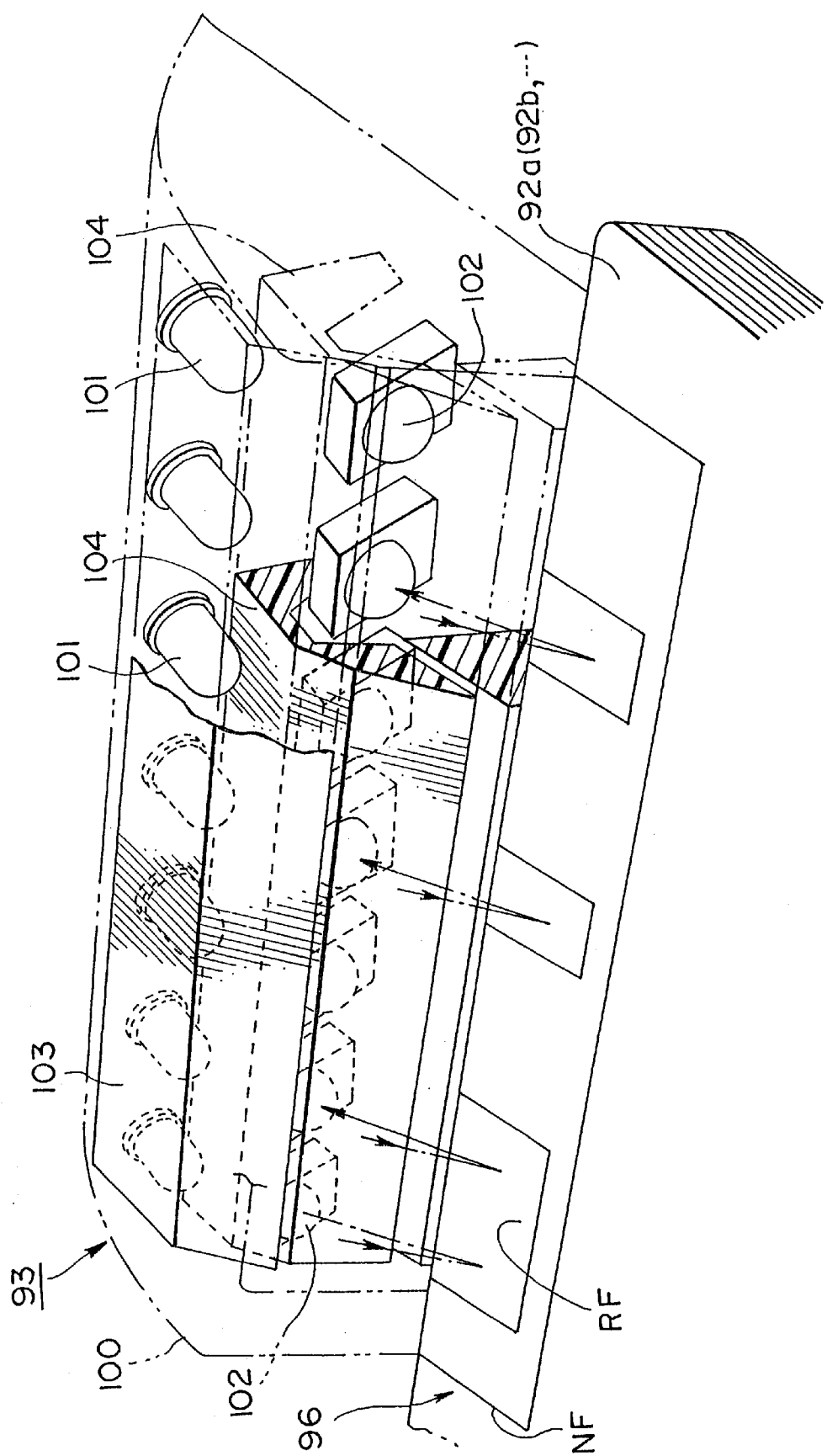
FIG. 15 is a perspective view of a partially broken-away data input device with a reader and a binary code.

The binary code 96, one example of which is shown in FIG. 15, has a wholly elongated belt-like area on which a rectangular white optical reflective surface RF and a rectangular black optical non-reflective surface NR are formed depending on a page number concerned. Since the reflective surface RF reflects light to express, for example, a binary "1" whereas the non-reflective surface NR reflects substantially no light to express, for example, a binary "0". The binary code 96 of FIG. 15 provides binary information for seven bits in correspondence to seven optical sensors set.

Figure 16:
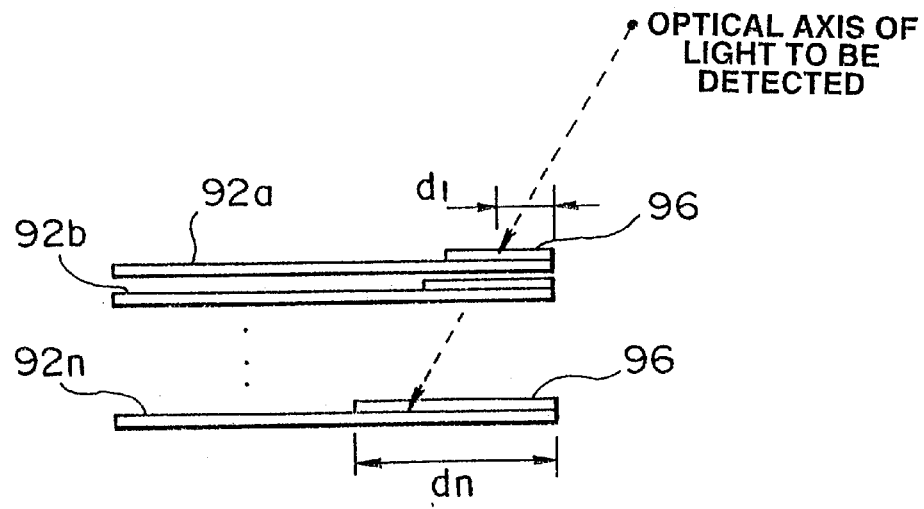
FIG. 16 schematically illustrates a geometrical positional relationship between the size of a binary code on a card and detected light.

One of the features of the present invention is embodied in the binary code 96. It relates to the area of the binary code 96. The position of the reader 93 is fixed, as will be described later. Thus, when the current page number of an open card is small, the distance between the reader 93 and the surface of the binary code 96 is small and a detection distance d1 from the code area edge near the base 104A to the light irradiation position is also small (FIG. 16). As the cards 92a, 92b, . . . are sequentially turned over, the detection distances d1 gradually increase, and the code area widths Dn also increase gradually away from the LED (FIG. 16). The sizes (areas) and/or lenghths of the binary codes 96 on the cards 92a, 92b, . . . expanding from their respective upper edges are arranged to increase gradually as the cards are sequentially turned over and hence their page numbers sequentially increase (or alternatively, cards 92a, 92b, . . . may be arranged to have thereon fixed code areas whose positions deviate gradually away from the respective upper edges thereof when the cards are sequentially turned over), in order that the page of interest can be detected even when its turned-over page number increases, in order that the page of interest can be detected even when its turned-over page number increases.

The reader 93 is provided integrally or substantially integrally with the device body 91 and is placed at a position deviating horizontally and upward from the binary code 96. Thus, even when the cards 92a, 92b, . . . are sequentially turned over, they are not hindered by the reader 93.

One example of the detailed structure of the reader 93 is shown in FIGS. 15, 17–20. The reader 93 has a cover 100 fixed to the device body 91 in which a plurality of infrared LEDs 101, a like number of detection photodiodes 102 which detect reflected infrared light, a reflector plate 103 which reflects infrared light and a separator 104. The LEDs 101 and the photodiodes 102 are used in one-to-one corresponding relationship. In this case, for example, as shown in FIG. 15, the number of LEDs 101 and the number of photodiodes 102 each are seven. The separator 104 is used to shield light other than reflected light from a page detection surface (binary code surface) to the utmost and to support the optical elements.

Figure 17:
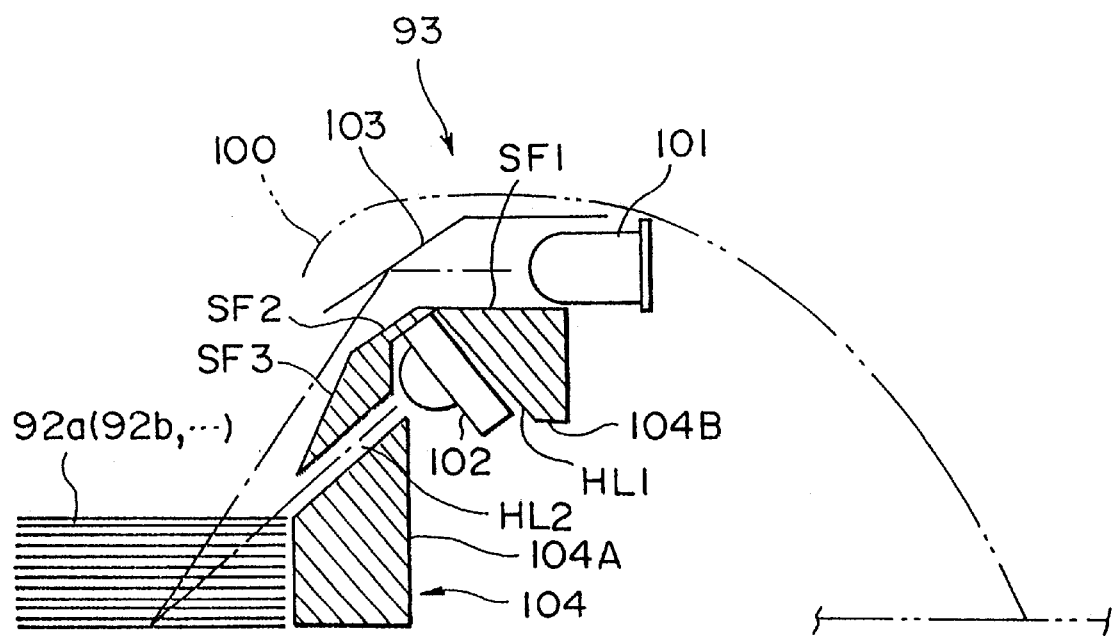
FIG. 17 is a schematically cross-sectional view of the reader.
Figure 18:
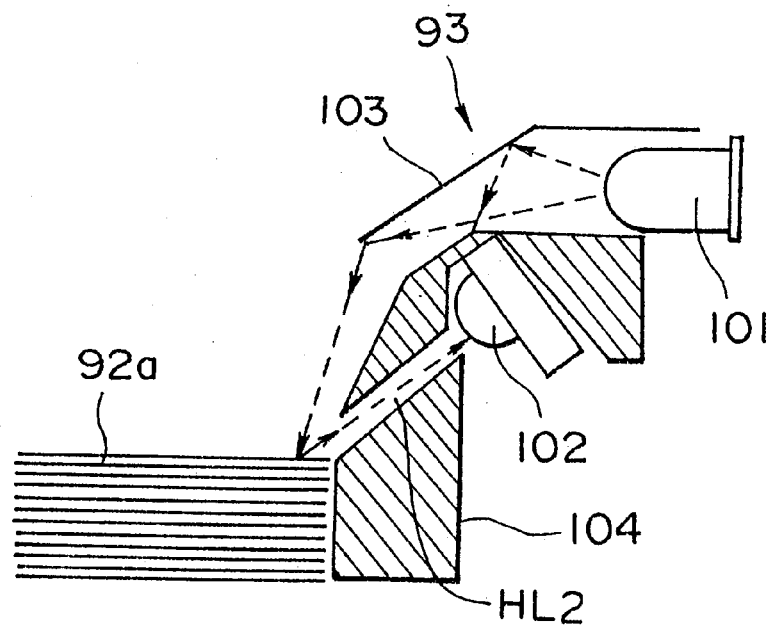
FIG. 18 schematically illustrates a locus of detected light between the reader and a card page at a shallow position.

The separator 104 is made, for example of a plastic resin and has a length covering substantially the whole area of the elongated reader 93. As shown in FIG. 17, the separator 104 has a substantially L-like cross section composed of a base 104A upstanding from the device body 91 and an arm 104B extending horizontally from the top of the base 104A away from the card side.

The upper surface of the separator 104 of FIG. 17 is composed of a first flat surface SF1 substantially parallel to the card surface, a second flat surface SF2 continuous to one end of the first surface and inclined at an angle to the surface SF1 and a third surface SF3 continuous to one end of the second surface and inclined at an angle to the second surface SF2 such that the optical axis of light emitted from the LED 101 intersects on the surface of the final page with that of light having the highest intensity incident to the photodiode 102. The LED 101 is disposed along the first flat surface SF1. A roof-like reflector 103 is provided so as to cover the upper surface of the separator 104 with a predetermined spacing therebetween. The space between the upper surface of the separator 104 and the reflector 103 forms a transmission path for the light emitted from the LED 101. Thus, the central axes of the light emitted from the LED 101 is horizontal at first, then reflected by a roof-like half of the reflector 103 so as to be sent toward the binary code 96 of one of the cards 92a, 92b, . . .

The detection photodiode 102 is set in a recess HL1 provided on a lower surface of the separator 104 in the vicinity of a boundary between the base 104A and the arm 104B such that the photodiode 102 receives light reflected by a card surface and incoming through an inclined through hole HL2 provided in the base 104A.

The features of the structure of the optical system will next be described along with optical detection of a page. The light used in this optical system is not a laser beam, but infrared light from a standpoint of cost reduction although the laser beam may be used. Thus, there is an optical axis where the intensity of the infrared light is highest, shown by a dot-dashed line in FIG. 17.

Figure 20:
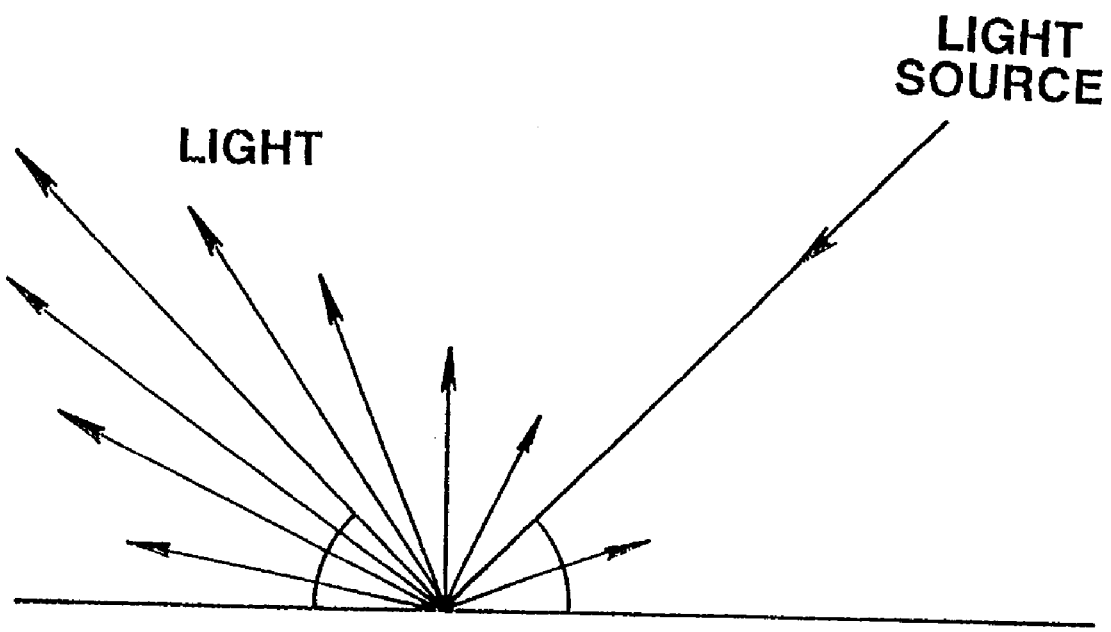
FIG. 20 illustrates the dispersion of light due to its reflection.

Assume now that the number of cards 92a, 92b, . . . turned over is small and a page to be detected is at a shallow position. The (infrared) light emitted from the LED 101 in this state propagates while diverging, as shown by broken lines in FIG. 18, and is reflected by the reflector 103 and then arrives at the binary code 96 of the card concerned. The reflection of the arriving light is illustrated in FIG. 20. A part of the light reflection enters the photodiode 102 through the detection hole HL2. The optical axis of the part of the reflection deviates from the optical axis of light having the maximum intensity, but the intensity of that part of the reflected light is relatively high because a detection distance indicative of the sum of the distance between the LED 101 and the binary code and the reflective distance between the binary code and the detection photodiode 102 is small. Thus, binary information on the binary code 96 is recognized by the presence/absence of the reflected light.

Figure 19:
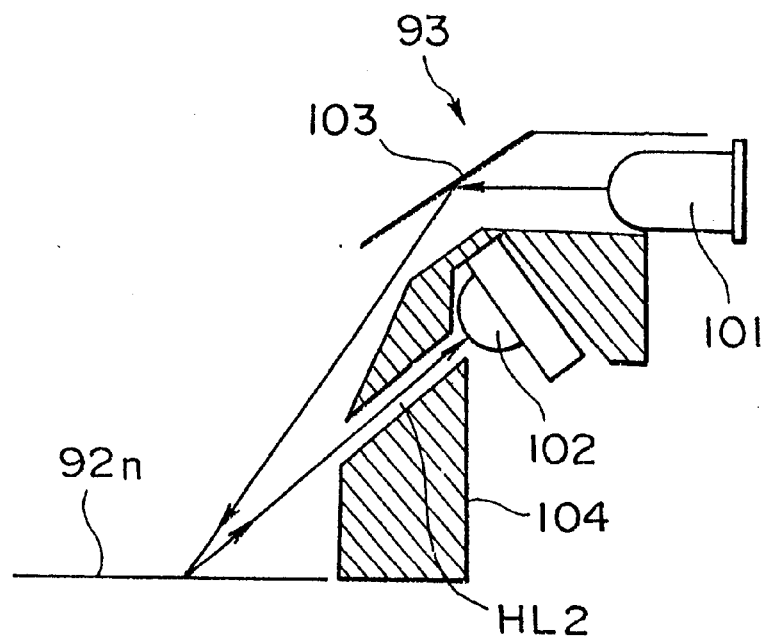
FIG. 19 schematically illustrates a locus of detected light between the reader and a card page at a deeper position.

Assume now that many of the cards 92a, 92b, . . . are turned over and a page to be detected is at a deeper position. As the position of the page becomes deeper, the detection distance increases. In the present embodiment, the dimensions of the optical system are designed such that as the detection distance increases, the optical axes of the incident and reflected light components utilized move so as to coincide with the optical axes of the light having the maximum intensity in the optical system (FIG. 17). That is, in order to adapt to this situation, the left edge of the binary code 96 area which receives light moves leftward or the binary code 96 area increases leftward. As shown in FIG. 19, in the detection of the page of the deepest final card 92n, the optical axes of the incident and reflective light coincides with the optical axes of the incident and reflective light having the maximum intensity of FIG. 17. As described with reference to FIG. 16, the area of the reflective surface RF of the final page surface (binary code surface) is maximum. By the synergy of approach of the optical axes of the light used to the optical axes of the light having the maximum intensity and an increase in the area of the reflective surface RF of the binary code surface, an insufficiency in the optical intensity which would occur due to an increase in the detection distance is avoided and binary information on the binary code 96 is read by the detection photodiode 102.

The inventors have experimentally discovered that the whole height of the piled pages (which compose a book) detectable optically was, for example, 0–15 mm.

The reader 93 of this embodiment is different from a conventional ordinary reflective type photointerrupter. In the present embodiment, the central axis of light emitted from the light emitting element is oriented in a direction unrelated to the direction of the presence of a binary code 96 which is an object to be detected, and the light is then guided by the reflector such that the central axis of the light is directed toward the binary code 96. Thus, in design, the degree of freedom of LED 101 installation is increased.

The light incident to the surface of the binary code 96 is reflected or dispersed in obedience to Snell's Law, as shown in FIG. 20. That is, the light is reflected in every directions depending on the state of the reflective surface although their intensities are different from each other. Thus, the reflected light having the highest intensity propagates away from the reader 93 while several remaining light components enter the photodiode 102 so as to serve optical detection or reading of the binary code. Thus, the reader 93 is an unique optical sensor system using "weak reflected light" which is not used in the conventional reflective type photointerrupter.

The height of the incident side opening of the detection through hole HL2 in the separator 104 is set at the shallowest position of a page to be detected. Thus, by the separator 104, reflected light due to the outer edges of each of the cards 92a, 92b, . . . is shielded to thereby ensure the prevention of erroneous operations.

Figure 21:
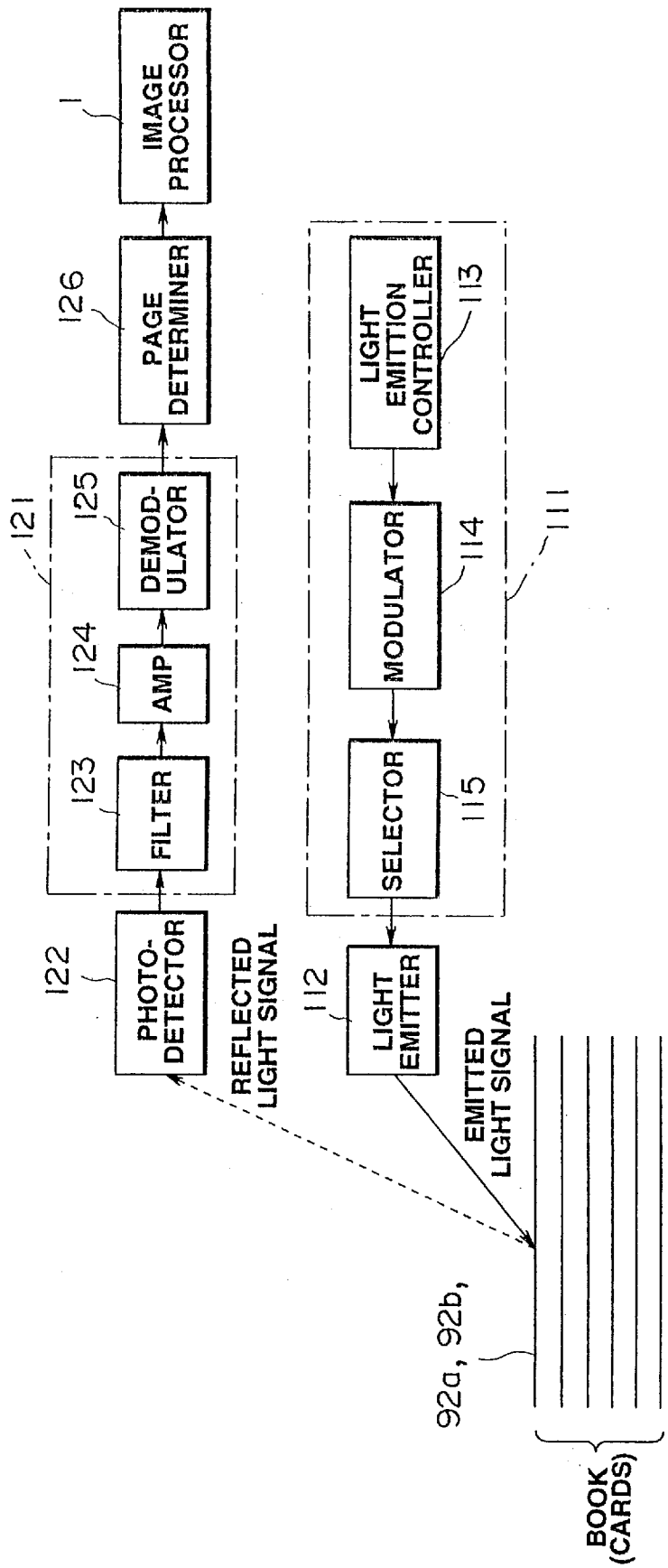
FIG. 21 is a block diagram of an electrical system connected to a light emitter and a photodetector.

FIG. 21 shows a basic example of an electrical light emission driver and a signal processor connected to the optical system. A light emission driver 111 is connected to a light emitter 112 composed of a plurality of LEDs 101. The driver 111 is provided with a light emission controller 113, a modulator 114, and a selector 115 in this order with the selector 115 being connected in parallel or series with the LEDs 101 of the light emitter 112. The light emission controller 113 generates a pulse signal and controls its duty cycle. The modulator 114 modulates a pulse signal with a frequency detected by a filter of a signal processor to be described later to eliminate or suppress the influence of external light. The selector 115 selects an LED 101 to emit light and delivers a modulating signal to the selected LED 101.

A selector 115 may be driven so as to sequentially select the detection surface of the binary code 96 in units of a bit or in units of every other bit or every two or more bits to avoid the influence of external light or a reflection signal from adjacent bits.

The signal processor 121 is connected to a photodetector 122 composed of a plurality of photodiodes 102. The signal processor 121 is provided with a filter 123, an amplifier 124 and a demodulator 125 in this order with the filter 123 being connected in parallel or series with the photodiodes 102 of the photodetector 122. The filter 123 extracts the modulation signal modulated with the specified frequency from the received signal obtained by opto-electric conversion in the photodiode 102. The amplifier 124 amplifies the modulation signal to a desired degree. The demodulator 125 eliminates, as external noise, detected light appearing outside the period of time of light emission controlled by the light emission controller 113 from the amplified modulation signal. The demodulator 125 is connected through a page determiner 126 to the image processor 1.

As a result, the binary code 96 of the card (92a, 92b, . . . ) is irradiated with the light modulated with the specified frequency from the selected LED 101. When the irradiated light impinges on the reflective surface RF of the binary code 96, a part of the reflection enters the selected photodiode 102. When the irradiated light impinges on the non-reflective surface NF, there is no incident light to the photodiode 102. Thus, the photodiode 102 converts the incident light to an electric signal, so that the page determiner 126 determines the page or card 92a, (92b, . . . ) turned over at present on the basis of an electric (modulation) signal responsive to the presence of the indecent light).

In order to improve the accuracy of reading or detecting the binary code on the page in this determination, the page may be read repeatedly and determined on the basis of the result of the reading operation.

Information on the page determination is delivered to the image processor 1 as in the previous embodiment to display information on the current page.

As described above, according to the particular embodiment, the following advantages are produced.

First, the page detection surfaces of the cards 92a, 92b, . . . are formed with corresponding binary codes 96, so that a large amount of page information can be contained in each page detection surface. Unlike the conventional technique which requires to prepare for sensors equal in number to pages to be detected, pages of many cards are detectable which are equal to the nth power of 2 where n is representative of the number of sensors each composed of a set of an LED and a photodiode (if the number of sensors is seven, up to 128 pages of cards are turnable over) in the case of the binary code.

Secondly, the reader 93 is installed at a position deviating horizontally and upward from the position of a binary code 96 on the page detection surface, so that the reader 93 never hinders turning over the cards 92a, 92b, . . . smoothly.

Thirdly, when the respective pages are turned over in a conventional contact type binary bar code reader, the sensor or a book (cards) is required to be moved. In contrast, according to this embodiment, such movement is not required. Only by turning over the respective pages, the respective pages are detected automatically. That is, operability is improved and the inventive device is easy to handle.

Fourthly, as the respective piled cards 92a, 92b, . . . are turned over, the areas of the respective binary codes 96 are proportionally increased away from the LED so as to receive light having an axis approaching that of light having the highest intensity. Thus, there is substantially no error of detection due to the number of cards 92a, 92b, . . . turned over or the depth of a page to be detected to thereby perform stabilized page detection.

Fifthly, no laser beam is used in the optical system. A set of an infrared light emitter and an infrared photodetector of the type which easily applies infrared light to a binary code area and easily receives the reflected light, both the light emitter and photodetector being easy to install, is used as a non-contact sensor. Thus, the reader as the page detection means has a relatively simple and compact structure. Especially, since the plate-like reflector is used, the height of the head of the reader is limited and the input unit is simplified in design.

Sixthly, the influence of external light is eliminated, advantageously. Binary information on the binary code 96 is detected by reflecting an optical pulse signal modulated with a particular frequency, as described above, and hence the true reflection from the binary code 96 surface is clearly distinguished from external noise light because only a signal having the modulation frequency is extracted from the reflection. Thus, the accuracy of detecting the binary code 96 is greatly improved.

Seventhly, the cards fulfills a security function. By recording the type of a book in the form of a page number plus the binary code, a program which is started up in the image processor (personal computer) connected to the data input unit is automatically selected. Since the book and the program which are distant physically from each other are placed in a cooperative state, the type of the book is automatically detected from the binary code. Thus, without the book, the program in the image processor is not started up, so that the book (cards) provides a kind of security function.

Figure 22:
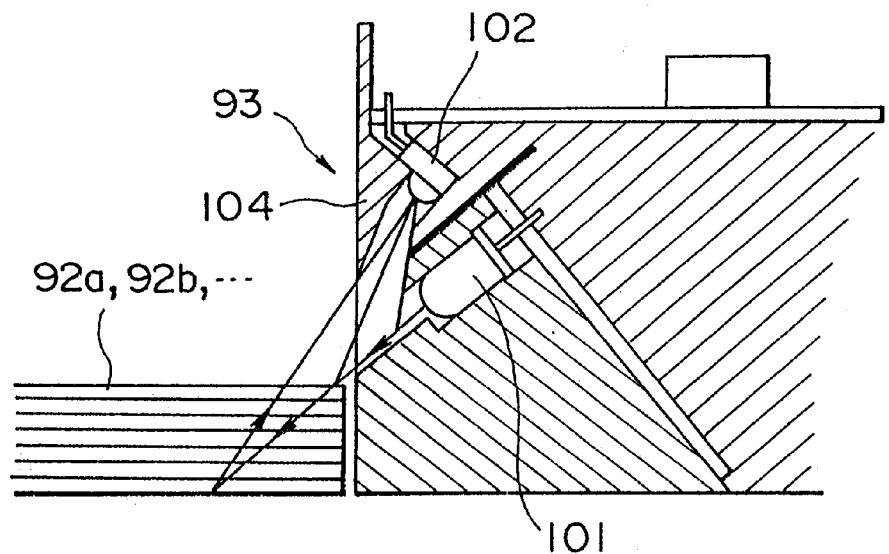
FIG. 22 is a schematic cross-sectional view of another reader.
Figure 23:
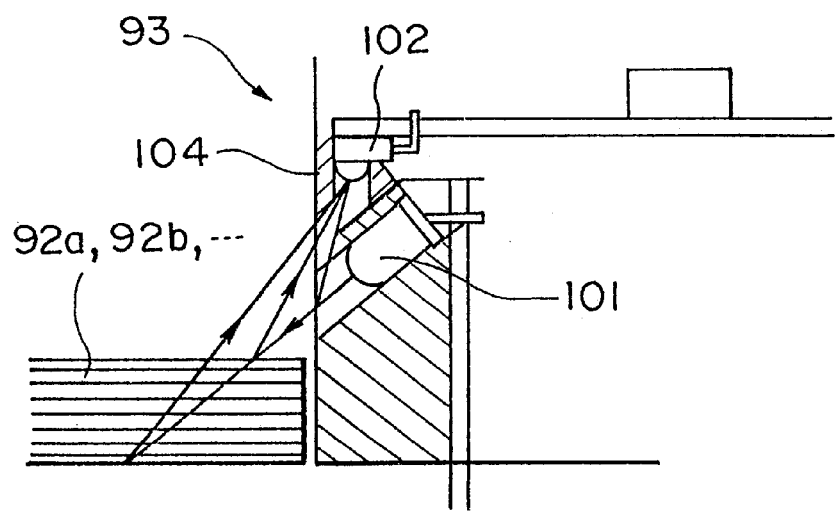
FIG. 23 is a schematic cross-sectional view of still another reader.
Figure 24:
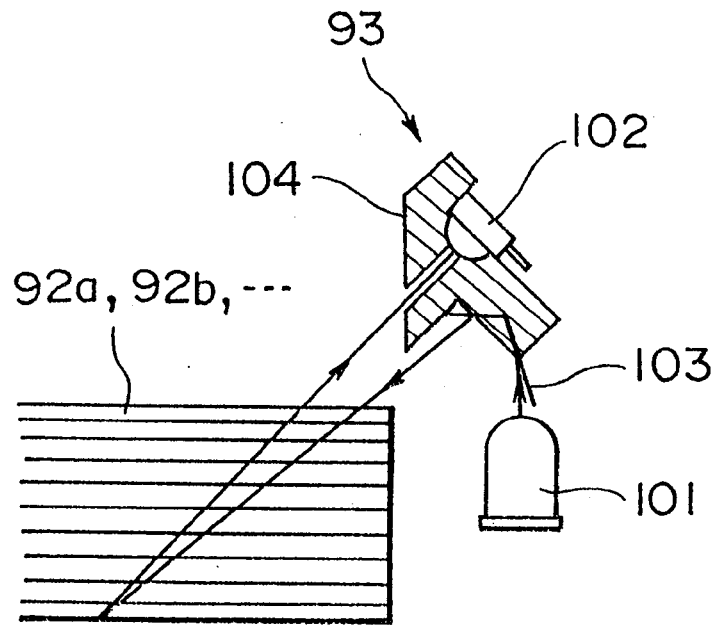
FIG. 24 is a schematic cross-sectional view of a further reader.
Figure 25:
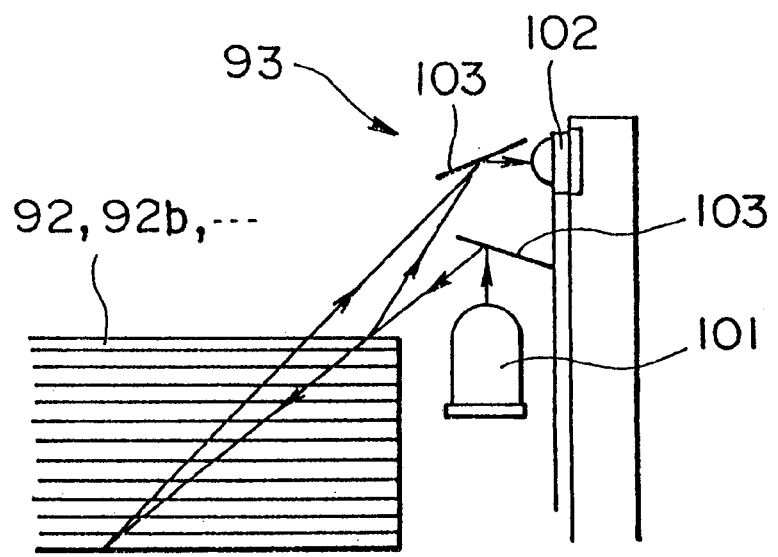
FIG. 25 is a schematic cross-sectional view of a still further reader.
Figure 26:
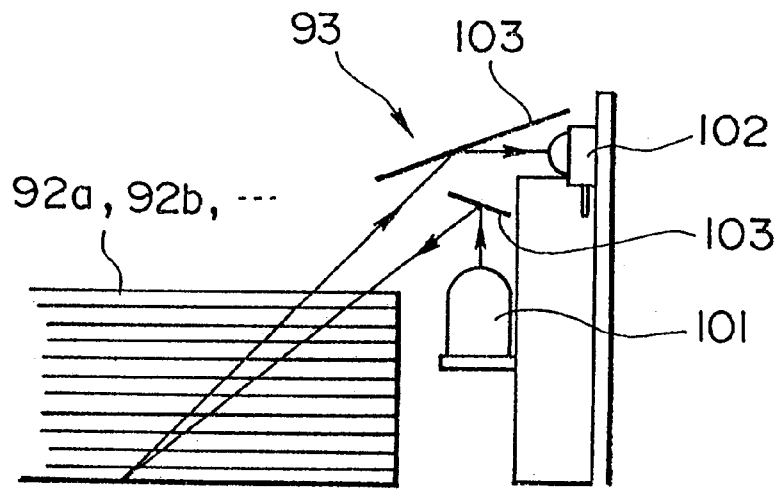
FIG. 26 is a schematic cross-sectional view of another reader.
Figure 27:
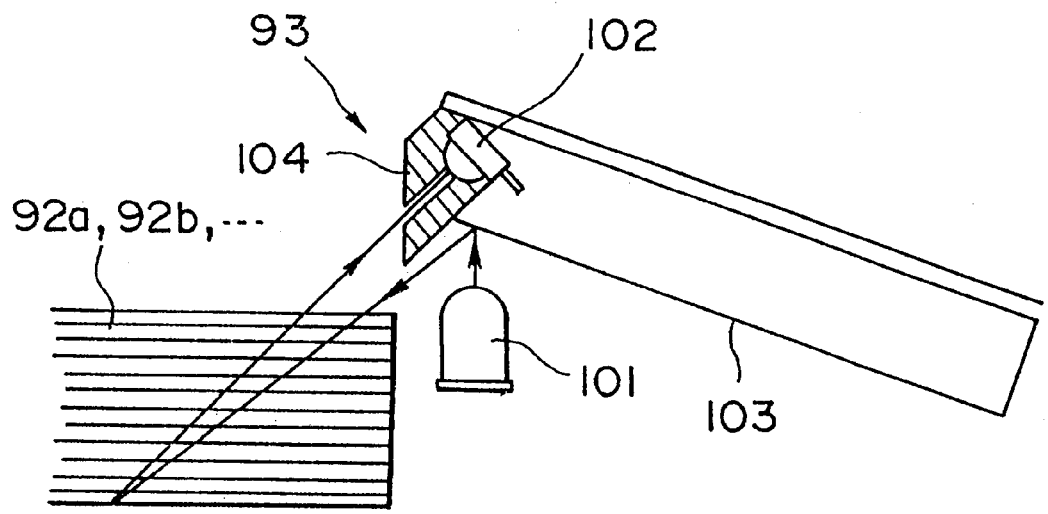
FIG. 27 is a schematic cross-sectional view of still another reader.
Figure 28:
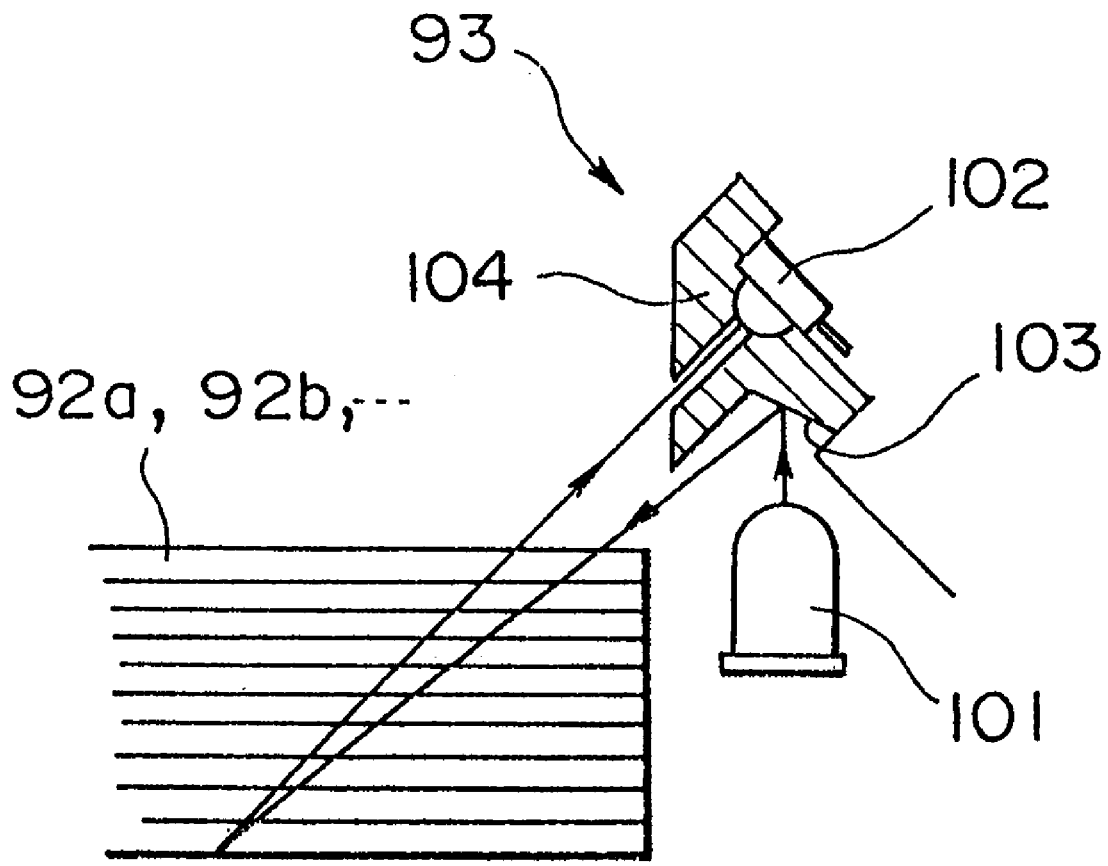
FIG. 28 is a schematic cross-sectional view of a further reader.

There are various modifications of the reader 93, as shown in FIGS. 22–28. The readers 93 of FIGS. 22 and 23 are optical sensors which use direct light and will do not use a reflector. The readers have a shortened light path and a higher intensity of light detection compared to the reflector type.

The readers 93 of FIGS. 24–28 are optical sensors using various reflectors. The reader 93 of FIG. 24 twice reflects light from the LED 101 by a reflector 103. The readers of FIGS. 25 and 26 once reflect each of transmitted and reflected light components. The reader 93 of FIG. 27 once reflects the light from LED 101 with a reflector 103, which also function as a shielding plate to thereby reduce the number of parts which compose the reader. The reader 93 of FIG. 28 once reflects the light from LED 101 with a reflector 103 formed on a separator 104. As just described above, the use of the reflector serves to suppress the height of the reader from the system body and reduces a space where the reader is installed.

Fifth Embodiment

The fifth embodiment of the present invention will be described next with reference to FIGS. 29 and 30. This embodiment is another example of eliminating the influence of external light in the data input device of the fourth embodiment. The same reference numeral is used to denote similar components of the embodiments of the fifth and fourth embodiments, and further description of the component will be omitted.

Figure 29:
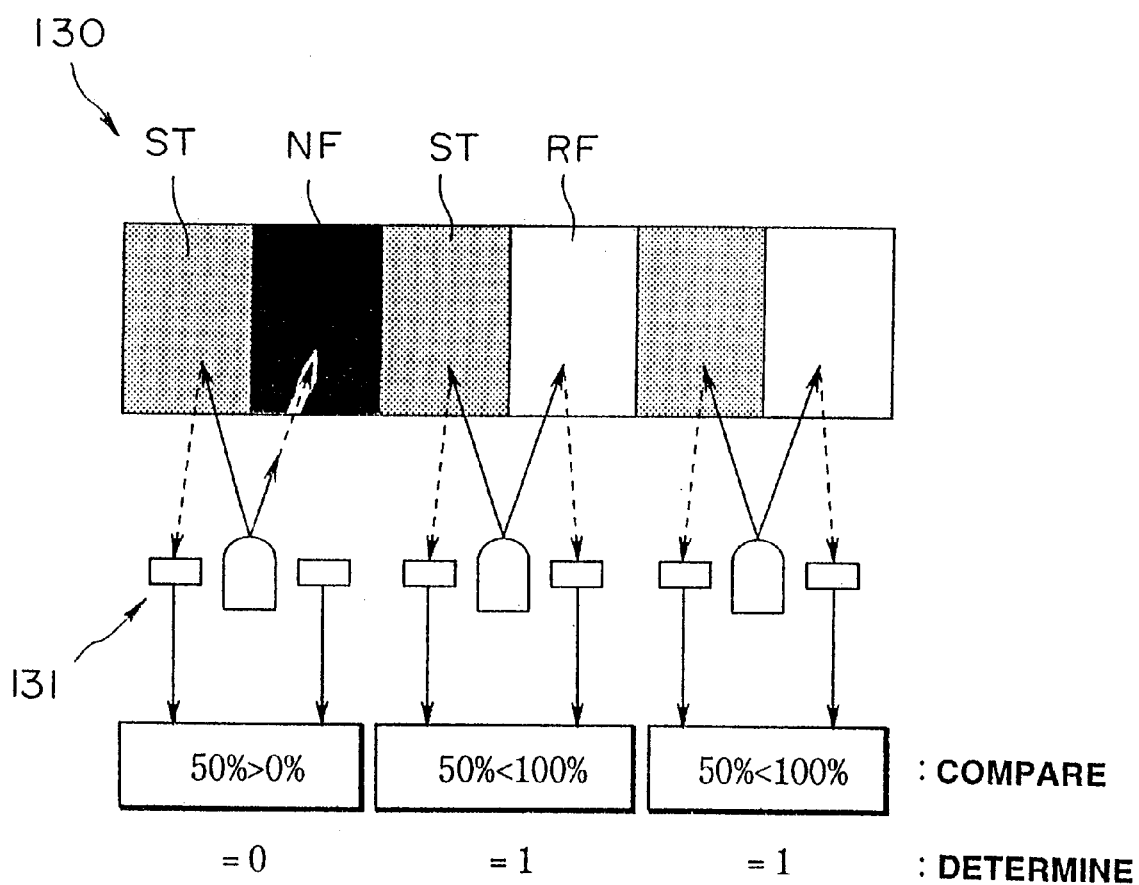
FIG. 29 is a schematic plan view of a reader of a data input device and a binary code used in an image processing system as a fifth embodiment.

The respective cards 92a, 92b, . . . of the data input device of the fifth embodiment have a binary code 130 illustrated in FIG. 29. The binary code 130 is composed of individual bit detection surfaces (a reflective surface RF and a non-reflective surface NF) indicative of binary information and a reference surface ST disposed between two adjacent bit detection surfaces. That is, the binary code 130 is composed of alternately arranged bit detection surfaces and reference surfaces ST or a chain of pairs of a detection surface and a reference surface ST.

The reader 131 is composed of a chain of sets of an LED 101 and two photodiode 102A and 102B, each set for one bit. In more detail, when the reader 131 is viewed from above, as shown in FIG. 29, an LED 101 is positioned so as to face the boundary between a bit detection surface RF (NF) and a reference surface ST concerned, and the two adjacent photodiodes 102A and 102B are disposed so as to face the respective midpoints of the bit detection surface RF(NF) and reference surface ST.

An electrical circuit connected to the reader 131 is partially shown in FIG. 30. A photodetector 122A composed of photodiodes 102A which face the corresponding bit detection surfaces RF (NF) and photodiodes 102B which face the corresponding reference surfaces ST are connected to a level comparator 132, which compares for each bit the level of reflected light detected by the photodetector 122A with that of the reflected light detected by the reference surface photodetector 122B and represents the result of the comparison in a binary value.

Assume now that a bit detection surface RF (NF) and a related reference surface ST are equally irradiated with light from the LED 101 for a bit. Let the reflective light level representative of a binary "0" be 0%, let the reflective light level representative of a binary "1" be 100%, and let the reflective light level from the reference surface ST be 50%. The level comparator 132 compares the level of the reflected light from the bit detection surface RF (NF) with the reference level of the reflected light from the reference surface ST and represents the result of the comparison in "0" or "1". The result of the determination for three respective bits shown in FIG. 29 are "0", "1", and "1" from left.

Almost actually, the external light equally influences both the bit detection surface RF (NF) and the reference surface ST. By analogly comparing for each bit both the reflected light components from the surfaces RF (NF) and ST, and the influence of the external light, if any, is actually eliminated materially.

As will be obvious from the above, the modulation and demodulation mentioned above are not required and the influence of the external light is eliminated in the analog level. Even when the height of a page to be detected and hence the intensities of the reflected light is changed, the intensity of the reflected light from the bit detection surface and the reference surface change in the same degree. As a result, fluctuations of the accuracy of page detection due to the turnover of a card or a change in the height of a page to be detected are eliminated.

Thus, the page detection is performed with high reliability in a relatively simple process. Effects or advantages similar to those produced by the fourth embodiment are also produced by the fifth embodiment.

While in the present embodiment the reflected light is illustrated as converted by the photodiode to an electrical signal, a CCD (Charge-Coupled Device) or a CDS (photocell Cd, Se photo conductive cells) may be used in place of the photodiode.

In addition, as application of the present invention, a so-called book reader is contemplated which reproduces from the speaker a voice corresponding to a read page number by utilizing the data read by the page reader in conjunction with voice data stored in a storage medium such as a CD-ROM or a ROM cassette.

Advantages

As described above, according to the present invention, detection of various information on a position can be performed by input means of various types.

More specifically, according to one aspect of the present invention, frequencies are allocated for the respective colors. Thus, when characters or a picture is drawn on a panel with predetermined input means, information on the position of the characters or picture and on their color is directly determined from the predetermined frequency produced by the input means. By delivering this information to the image processing means, the image processing is performed on the basis of the determined color information and the position information to thereby provide on the display screen an image similar to that drawn in the drawing area.

According to the present invention, the input means produces a frequency depending on predetermined color information, so that the color information is securely specified from the frequency. Since the input means includes writing means which draws an image on a drawing area, for example, on a paper sheet, and produces a frequency depending on the color of the writing means, the characters and/or a picture can be drawn with the writing means on the drawing area as well as the color of the writing means coincides securely with the color of the characters and/or picture reproduced by the image processing means.

According to the present invention, the input means includes writing means which draws characters and/or a picture on a paper sheet, oscillating means for generating a frequency depending on the color of the writing means, and a pen-like housing which accommodates the writing means and the oscillating means. Thus, the input means may be used like an actual writing instrument.

According to the present invention, the input means generates an allocated frequency for a predetermined period of time only when the input means is disposed on the panel, so that the respective input means may be specified even when many frequencies for the input means are used.

While the input means produces an oscillating reference frequency inherent to the input means and changes the frequency depending on a predetermined writing pressure applied to the input means to change an output signal to draw characters and/or a picture in a thin color to an output signal to draw characters and/or picture in a thicker color. Thus, an image which is the same as that drawn actually on a drawing area, for example, of a paper sheet, is displayed on the display means.

According to another aspect of the present invention, the data input device includes a plurality of cards each used as a data input medium with a code section at one end of the medium which records information containing at least card's page, means for piling cards changeable in number, and detection means disposed relative to the piling means so as to face the code section of a card at a position deviating horizontally and upward from the card such that information on the code section is detected in a non-contact manner. The code section includes, for example, a binary code. Various complex information including, for example, page numbers which change as the respective cards are turned over can be set on the code section. An image processing system is provided which includes a small inexpensive easy-to-handle data input device capable of detecting a page in a non-contact manner even when the number of cards or pages increases, the turnover of the cards being not hindered physically by the detection means.

What is claimed is:

1. An image processing system comprising:

a data input device for generating input data;

an image processing device for performing a predetermined image processing operation on the data inputted by said data input device; and a display device for displaying the result of the image processing operation performed by said image processing device;

wherein said data input device comprises a plurality of input instruments each including input means, and a structure to detect information on a position where said input means is manipulated to thereby increase a quantity of information to be detected, wherein said input means in each of said input instruments includes means for generating a frequency inherent thereto and means for changing said frequency depending on a writing pressure applied to said input means, wherein said means for changing frequency switches said frequency from one value to another at a predetermined point of said writing pressure, wherein said data input device comprises a panel responsive to a touch of said input means to said panel for detecting information on a position of the touch and for selecting color information corresponding to the frequency, and wherein said image processor performs an image process on the basis of the selected color information.

2. The image processing system according to claim 1, wherein said input means comprises oscillating means for producing a frequency depending on predetermined color information.

3. The image processing system according to claim 1 or 2, wherein said input means comprises writing means for writing a character, a symbol and/or a figure on a drawing area, and oscillating means for producing a frequency depending on the color of each of said input instruments.

4. The image processing system according to claim 1 or 2, wherein said input means comprises writing means for writing a character, a symbol and/or a figure on a drawing area, and oscillating means for producing a frequency depending on the color of each of said input instruments, and wherein each of said input instruments comprises a pen-like housing for accommodating said writing means and oscillating means.

5. The image processing system according to claim 1, wherein said input means comprises oscillating means for producing an allocated frequency for a predetermined period of time only when said input means is placed on said panel.

6. The image processing system according to claim 1, wherein said input means comprises oscillating means for producing an allocated frequency for a predetermined period of time only when said input means is placed on said panel, and wherein each of said input instruments comprises a housing for accommodating said oscillating means.

7. A pen-like input device comprising said input means used in the system according to claim 1, said input means comprising writing means for writing a character, a symbol and/or a figure on a drawing area, and oscillating means for producing a frequency depending on the color of said pen-like input device.

8. An image processing system comprising:

a data input device which includes input means for inputting data to the system;

an image processing device for performing a predetermined image processing operation on the data inputted by said data input device; and a display device for displaying the result of the image processing operation performed by said image processing device;

wherein said data input device includes input means, wherein said input device further comprises a structure to detect information on a position where said input means is manipulated to thereby increase a quantity of information to be detected, wherein said data input device comprises a plurality of cards each used as an input medium for data with a code section at one end of that card on which information including at least a page of that card is stored, means for piling the cards the number of which is changeable, and detecting means disposed at a position deviating horizontally and upward from the card so as to face the code section on the card for detecting information on said code section in a non-contact manner, and wherein the code section contains a bar code which, in turn, contains information on the page concerned.

9. The image processing system according to claim 8, wherein the code section contains a binary code which, in turn, contains information on the page concerned.

10. The image processing system according to claim 8, wherein the area of the code section of a card increases away from said detecting means as the position of the card deepens.

11. The image processing system according to claim 8, wherein said detecting means comprises light emitting means for emitting light having any number of optical axes, and photodetection means for detecting a portion of the light emitted by said light emitting means and reflected by said code section.

12. The image processing system according to claim 11, wherein said detecting means comprises an optical reflector disposed in at least one of an optical path between said light emitting means and said code section and an optical path between code section and said photodetection means.

13. The image processing system according to claim 11, wherein said detecting means comprises light emission driving means for causing said light emitting means to emit light, and signal processing means for processing a signal depending on the reflected light portion detected by said photodetection means to read information includes a page of said card.

14. The image processing system according to claim 13, wherein said light emission driving means comprises a circuit for emitting light based on a signal modulated with a specified frequency, and said signal processing means comprises a circuit for extracting a signal having the specified frequency among from the reflected light portion detected by said photodetection means.

15. The image processing system according to claim 12, wherein said code section comprises for each bit a reference surface and a detection surface with the information on said detection surface, said photodetection means comprise for each bit a pair of a photodetection element for detecting the reflected light from said detection surface and a photodetection element for detecting reflected light from said reference surface, and said signal processing means compares output signals from both the photodetection elements to read the information.

* * * * *